(12) United States Patent
Katsumoto et al.

(10) Patent No.: US 9,592,695 B2
(45) Date of Patent: Mar. 14, 2017

(54) THERMAL TRANSFER RECORDING SHEET

(71) Applicant: CANON KABUSHIKI KAISHA, Tokyo (JP)

(72) Inventors: Yuko Katsumoto, Yokohama (JP); Masao Nakano, Kamakura (JP); Taichi Shintou, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,507

(22) Filed: Aug. 26, 2015

(65) Prior Publication Data

US 2015/0360495 A1    Dec. 17, 2015

Related U.S. Application Data

(63) Continuation of application No. PCT/JP2015/052288, filed on Jan. 28, 2015.

(30) Foreign Application Priority Data

Feb. 28, 2014  (JP) .................... 2014-038872

(51) Int. Cl.
| | | |
|---|---|---|
| *B41M 5/385* | (2006.01) | |
| *B41M 5/388* | (2006.01) | |
| *B41M 5/39* | (2006.01) | |
| *C09B 23/14* | (2006.01) | |
| *C09B 29/01* | (2006.01) | |
| *C09B 29/08* | (2006.01) | |
| *C09B 29/42* | (2006.01) | |
| *C09B 55/00* | (2006.01) | |
| *C09B 57/00* | (2006.01) | |
| *C09B 67/22* | (2006.01) | |
| *C09B 1/26* | (2006.01) | |
| *C09B 1/32* | (2006.01) | |
| *C09B 1/503* | (2006.01) | |
| *B41M 5/41* | (2006.01) | |
| *B41M 5/382* | (2006.01) | |

(52) U.S. Cl.
CPC .......... *B41M 5/3858* (2013.01); *B41M 5/385* (2013.01); *B41M 5/388* (2013.01); *B41M 5/39* (2013.01); *C09B 1/262* (2013.01); *C09B 1/325* (2013.01); *C09B 1/503* (2013.01); *C09B 23/143* (2013.01); *C09B 29/0003* (2013.01); *C09B 29/0811* (2013.01); *C09B 29/3626* (2013.01); *C09B 55/009* (2013.01); *C09B 57/00* (2013.01); *C09B 57/008* (2013.01); *C09B 67/0033* (2013.01); *B41M 5/3852* (2013.01); *B41M 5/3854* (2013.01); *B41M 5/3856* (2013.01); *B41M 5/38228* (2013.01); *B41M 5/41* (2013.01); *B41M 2205/30* (2013.01)

(58) Field of Classification Search
CPC .. B41M 5/385; B41M 5/3852; B41M 5/3854; B41M 5/3856; B41M 5/39; B41M 5/41
See application file for complete search history.

(56) References Cited

U.S. PATENT DOCUMENTS

| | | | | |
|---|---|---|---|---|
| 5,369,078 | A | * 11/1994 | Eguchi | ................. B41M 5/3858 |
| | | | | 428/913 |
| 2007/0213221 | A1* | 9/2007 | Arai | ...................... B41M 5/385 |
| | | | | 503/227 |
| 2011/0129624 | A1* | 6/2011 | Sanada | .................... B41M 5/39 |
| | | | | 428/32.75 |
| 2014/0162183 | A1* | 6/2014 | Katsumoto | ............. C09B 57/00 |
| | | | | 430/108.21 |
| 2014/0170553 | A1* | 6/2014 | Mori | ...................... G03G 9/122 |
| | | | | 430/108.23 |

FOREIGN PATENT DOCUMENTS

| | | |
|---|---|---|
| JP | 5-262062 A | 10/1993 |
| JP | 6-41459 A | 2/1994 |
| JP | 6-155929 A | 6/1994 |
| JP | 10-181225 A | 7/1998 |
| JP | 2000-511214 A | 8/2000 |
| JP | 2003-205686 A | 7/2003 |
| JP | 2009-241554 A | 10/2009 |
| WO | WO92/19684 A1 | 11/1992 |
| WO | 2014/034093 A1 | 3/2014 |
| WO | 2014/034094 A1 | 3/2014 |

* cited by examiner

*Primary Examiner* — Betelhem Shewareged
(74) *Attorney, Agent, or Firm* — Canon U.S.A., Inc., IP Division

(57) ABSTRACT

An object of the present invention is to provide a thermal transfer recording sheet that enables images having a wide color gamut, a high chroma, and good lightfastness, in which the degree of catalytic fading is reduced, to be formed. The thermal transfer recording sheet includes a base material and a colorant layer on the base material. The colorant layer includes a yellow dye layer, a magenta dye layer, and a cyan dye layer. The dye layers each include, as a dye, a compound having a specific structure.

4 Claims, No Drawings

THERMAL TRANSFER RECORDING SHEET

CROSS-REFERENCE TO RELATED APPLICATIONS

This application is a Continuation of International Patent Application No. PCT/JP2015/052288, filed Jan. 28, 2015, which claims the benefit of Japanese Patent Application No. 2014-038872, filed Feb. 28, 2014, both of which are hereby incorporated by reference herein in their entirety.

TECHNICAL FIELD

The present invention relates to a thermal transfer recording sheet.

BACKGROUND ART

With the widespread use of portable color-display devices, there has been a rapidly growing demand for printing in a simple manner photographs or documents that are captured or prepared using such devices in color. This may be realized by a color printing method such as electrophotography, an ink-jet method, or thermal transfer recording. In particular, thermal transfer recording is a suitable method for realizing printing in a simple manner regardless of circumstances, because it enables printing to be performed using a dry process and allows reduced printer size, which increases printer portability. In addition, dyes are used as colorants in thermal transfer recording. This enables the density of images to be controlled by changing the density and gradations of the colorants, which increases the vividness of the images and enables a high color-reproduction capability to be achieved.

Thermal transfer recording is an image-forming method in which a thermal transfer recording sheet constituted by a sheet-like base material and a colorant layer disposed on the base material, the colorant layer including a thermally migratable colorant, is superimposed on an image-receiving sheet including a colorant-receiving layer disposed on the surface thereof, and the colorant included in the thermal transfer recording sheet is transferred to the image-receiving sheet by heating the thermal transfer recording sheet in order to perform recording. In thermal transfer recording, colorants included in the transfer sheet or in an ink composition included in the transfer sheet are critical materials that affect the speed of transfer recording and the quality and preservation stability of the recorded images. There have been reported studies (see PTL 1, PTL 2, and PTL 3) in which high-chroma methine-based magenta coloring matters having high vividness, a high color-reproduction capability and a high color-developing density are used as colorants for the above-described thermal transfer recording (WO92/19684, Japanese Patent Laid-Open No. 05-262062, and Japanese Patent Laid-Open No. 2003-205686). However, it is known that these dyes have considerably poor lightfastness while they have a high chroma and a wide color gamut. Furthermore, when such magenta coloring matters are used in combination with other coloring matters such as a yellow coloring matter and a cyan coloring matter which have been proposed as colorants for thermal transferring, the magenta coloring matters may cause catalytic fading, which increases the rate of deterioration of the other colorants. Accordingly, production of a thermal transfer recording sheet that enables high chroma (i.e., vividness), wide color gamut (i.e., color-reproduction capability or color-developing capability) to be achieved, and good lightfastness to be achieved and the degree of catalytic fading to be reduced has been anticipated.

CITATION LIST

Patent Literature

PTL 1 WO92/19684

PTL 2 Japanese Patent Laid-Open No. 05-262062

PTL 3 Japanese Patent Laid-Open No. 2003-205686

An object of the present invention is to provide a thermal transfer recording sheet that enables images having a wide color gamut, a high chroma, and good lightfastness, in which the degree of catalytic fading is reduced, to be formed.

SUMMARY OF INVENTION

The above-described issues may be addressed by using a thermal transfer recording sheet including a base material and a colorant layer on the base material. The colorant layer includes a yellow dye layer comprising a yellow dye, a magenta dye layer comprising a magenta dye, and a cyan dye layer comprising a cyan dye. The magenta dye contains a compound represented by General Formula (1) below. The yellow dye contains at least one compound selected from the group consisting of compounds represented by General Formulae (2) to (5) below. The cyan dye contains at least one compound selected from the group consisting of compounds represented by General Formulae (6) to (8) below.

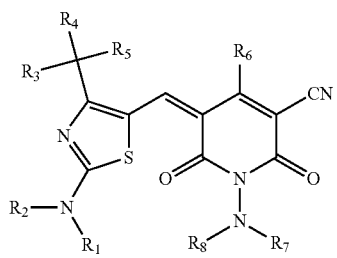

General Formula (1)

[In General Formula (1), $R_1$ to $R_6$ each independently represent an alkyl group, and $R_3$ to $R_5$ may be bonded to one another to form a ring; and $R_7$ and $R_8$ each independently represent an alkyl group or an acyl group and may be bonded to each other to form a ring]

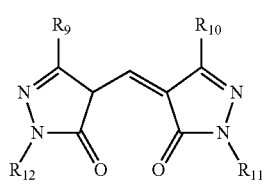

General Formula (2)

[In General Formula (2), $R_9$ to $R_{12}$ each independently represent an alkyl group, an aryl group having no substituents, or an aryl group having a substituent]

General Formula (3)

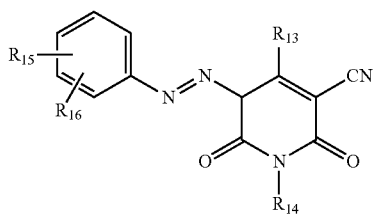

[In General Formula (3), $R_{13}$ and $R_{14}$ each independently represent an alkyl group, an aryl group having no substituents, or an aryl group having a substituent; and $R_{15}$ and $R_{16}$ each independently represent a hydrogen atom, an alkyl group, an aryl group having no substituents, an aryl group having a substituent, an alkoxy group, a cyano group, or a halogen atom]

General Formula (4)

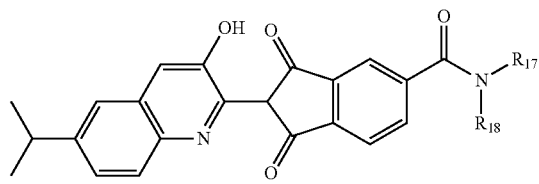

[In General Formula (4), $R_{17}$ and $R_{18}$ each independently represent an alkyl group, an aryl group having no substituents, or an aryl group having a substituent]

General Formula (5)

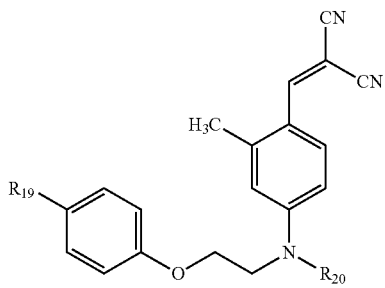

[In General Formula (5), $R_{19}$ and $R_{20}$ each independently represent an alkyl group, an aryl group having no substituents, or an aryl group having a substituent]

General Formula (6)

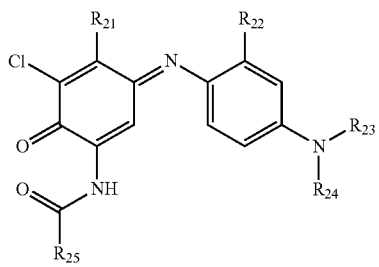

[In General Formula (6), $R_{21}$ to $R_{25}$ each independently represent an alkyl group, an aryl group having no substituents, or an aryl group having a substituent]

General Formula (7)

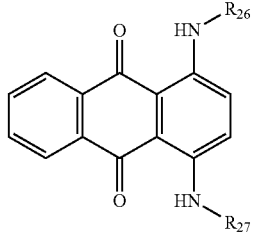

[In General Formula (7), $R_{26}$ and $R_{27}$ each independently represent an alkyl group, an aryl group having no substituents, or an aryl group having a substituent]

General Formula (8)

[In General Formula (8), $R_{28}$ to $R_{32}$ each independently represent an alkyl group, an aryl group having no substituents, or an aryl group having a substituent]

Further features of the present invention will become apparent from the following description of exemplary embodiments.

DESCRIPTION OF EMBODIMENTS

The present invention is further described in detail below.

The inventors of the present invention have conducted extensive studies in order to address the above-described issues and, as a result, found that images having a high chroma, a wide color gamut, and good lightfastness may be formed by using a compound represented by General Formula (1) below instead of compounds having a thiazole ring including, at the fourth position, a phenyl group having no substituents, which are described in the related art, as a magenta dye included in the magenta dye layer constituting the thermal transfer recording sheet.

The inventors of the present invention have also found that the degree of catalytic fading may be reduced by using, in addition to the magenta dye represented by General Formula (1), at least one compound selected from the group consisting of compounds represented by General Formulae (2) to (5) below as a yellow dye included in the yellow dye layer and at least one compound selected from the group consisting of compounds represented by General Formulae (6) to (8) below as a cyan dye included in the cyan dye layer. Thus, the present invention was made.

Magenta Dye

The magenta dye represented by General Formula (1) is described below.

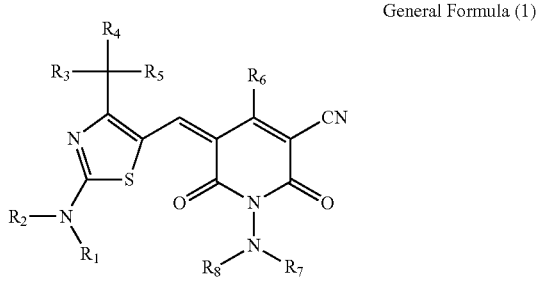

General Formula (1)

[In General Formula (1), $R_1$ to $R_6$ each independently represent an alkyl group, and $R_3$ to $R_5$ may be bonded to one another to form a ring; and $R_7$ and $R_8$ each independently represent an alkyl group or an acyl group and may be bonded to each other to form a ring]

Examples of the alkyl groups represented by $R_1$ and $R_2$ in General Formula (1) include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, a branched alkyl group such as a 2-ethylhexyl group is preferably used in order to improve ink solubility.

Examples of the alkyl groups represented by $R_3$ to $R_5$ in General Formula (1) include, but are not particularly limited to, alkyl groups having 1 to 4 carbon atoms. Specific examples of such alkyl groups include a methyl group, an ethyl group, an n-propyl group, an iso-propyl group, and an n-butyl group. In particular, $R_3$ to $R_5$ are more preferably all methyl groups in order to increase chroma, further widen color gamut, and improve lightfastness.

When $R_3$ to $R_5$ in General Formula (1) are bonded to one another to form a ring, examples of the ring include, but are not particularly limited to, polycyclic or monocyclic saturated cyclic hydrocarbon rings. Specific examples of the polycyclic or monocyclic saturated cyclic hydrocarbon rings include an adamantyl group, a cyclohexyl group, and a cycloheptyl group.

Examples of the alkyl group represented by $R_6$ in General Formula (1) include, but are not particularly limited to, alkyl groups having 1 to 20 carbon atoms. Examples of such alkyl groups include a methyl group, an ethyl group, an n-propyl group, an iso-propyl group, an n-butyl group, an iso-butyl group, a 2-methylbutyl group, and a 2,3,3-trimethylbutyl group. In particular, an n-butyl group is preferably used in order to increase chroma, further widen color gamut, and improve lightfastness.

When $R_7$ and $R_8$ in General Formula (1) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

When $R_7$ and $R_8$ in General Formula (1) represent an acyl group, examples of the acyl group include, but are not particularly limited to, alkylcarbonyl groups having 2 to 30 carbon atoms which has a substituent or no substituents and arylcarbonyl groups having 7 to 30 carbon atoms which has a substituent or no substituents. Specific examples of such acyl groups include an acetyl group, a propionyl group, a pivaloyl group, a benzoyl group, and a naphthoyl group.

When $R_7$ and $R_8$ in General Formula (1) are bonded to each other to form a ring, examples of the ring include, but are not particularly limited to, a piperidine ring, a piperazine ring, and a morpholine ring.

In particular, at least one of $R_7$ and $R_8$ is preferably an alkyl group in order to increase chroma, further widen color gamut, and further improve lightfastness, and the alkyl group is preferably a methyl group.

The magenta compound having a structure represented by General Formula (1) according to the present invention can be synthesized in accordance with the publicly known method described in WO92/19684. The compound represented by General Formula (1) has a cis-trans constitutional isomer, which is also within the scope of the present invention.

Preferred examples of the compound represented by General Formula (1) according to the present invention include, but are not limited to, the compounds (1) to (29) below.

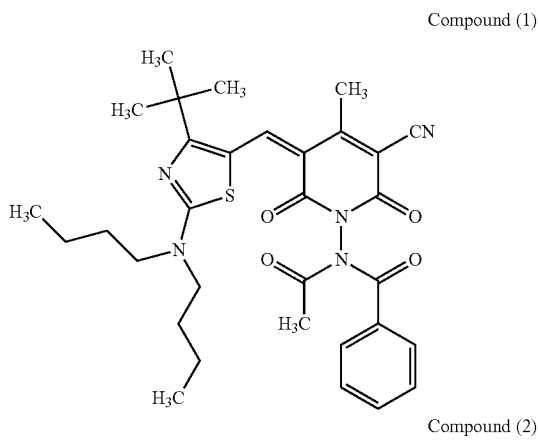

Compound (1)

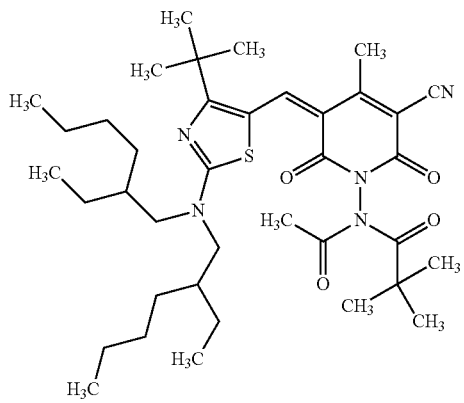

Compound (2)

Compound (3)
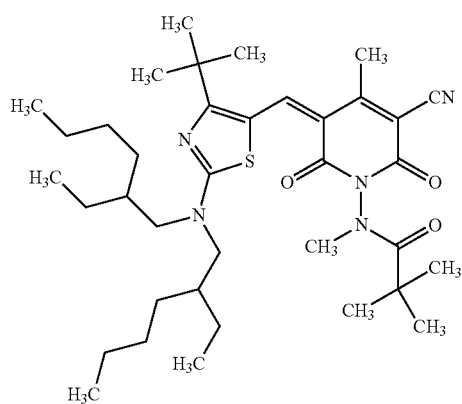
Compound (4)
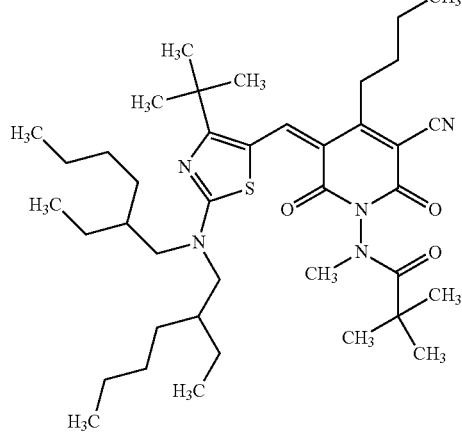
Compound (5)
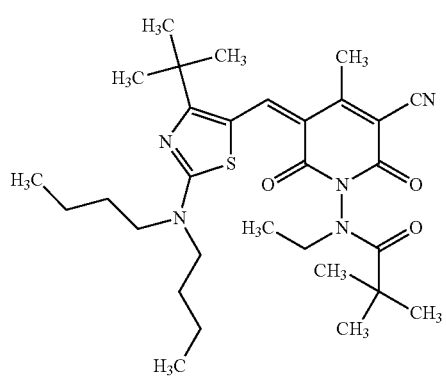
Compound (6)
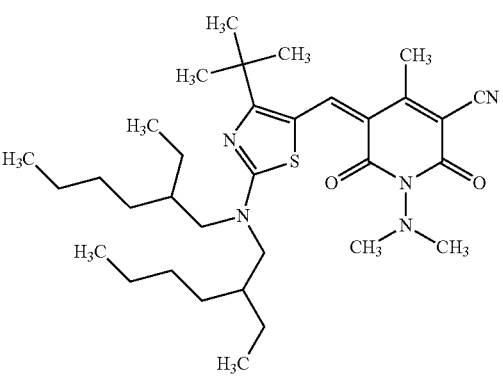
Compound (7)
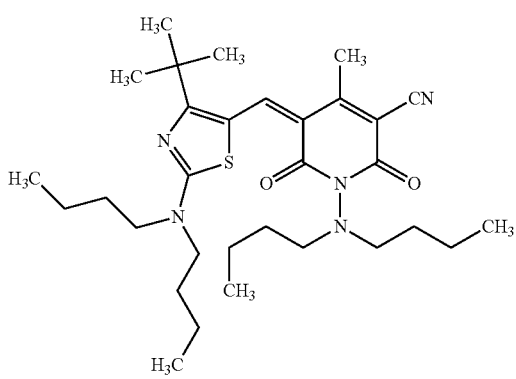
Compound (8)
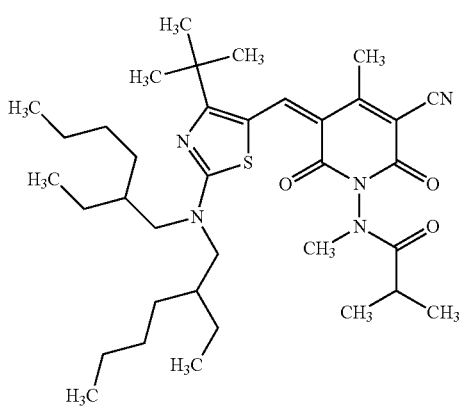

Compound (9)
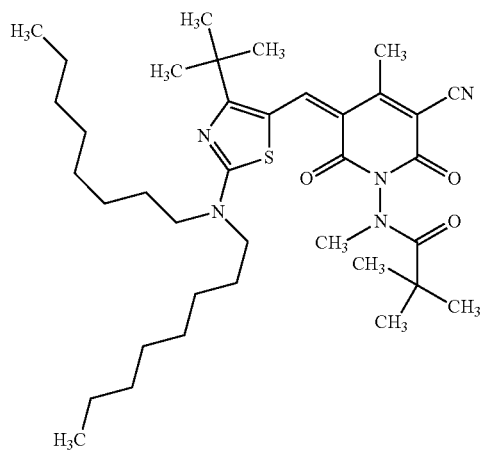
Compound (10)
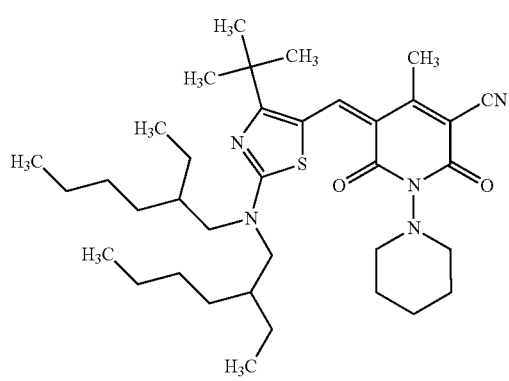
Compound (11)
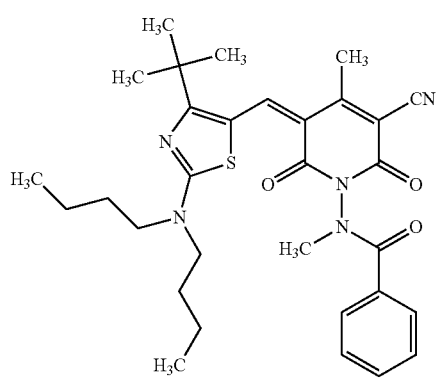
Compound (12)
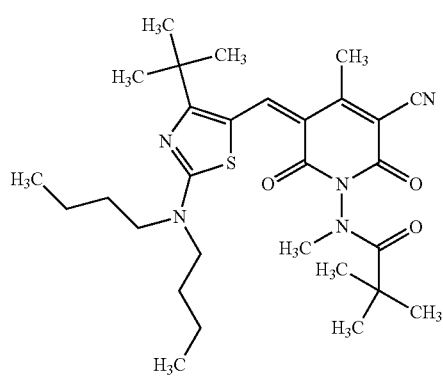
Compound (13)
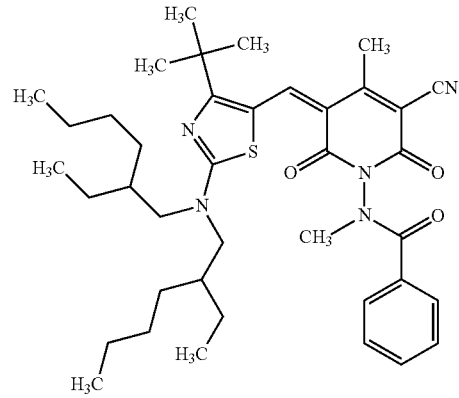
Compound (14)
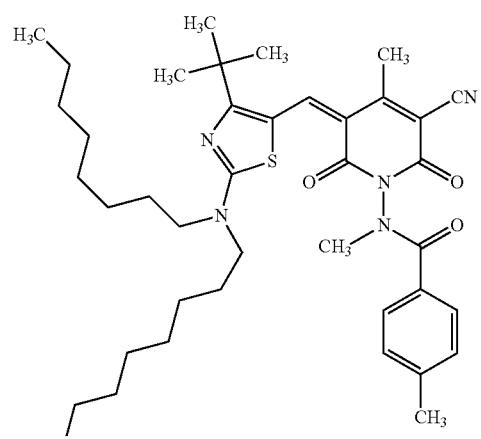
Compound (15)
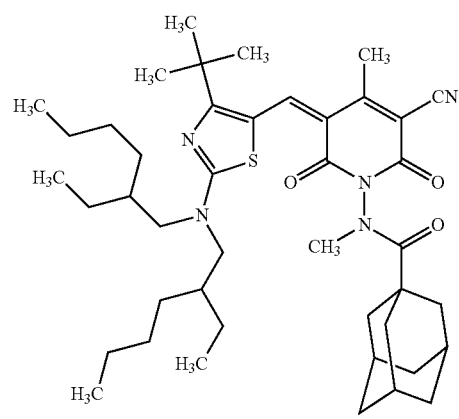

-continued
Compound (16)
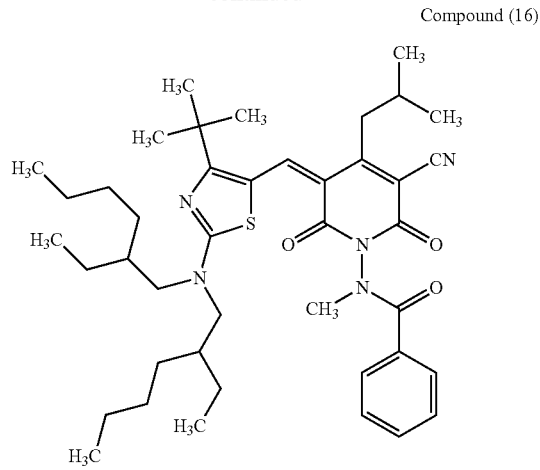
Compound (17)
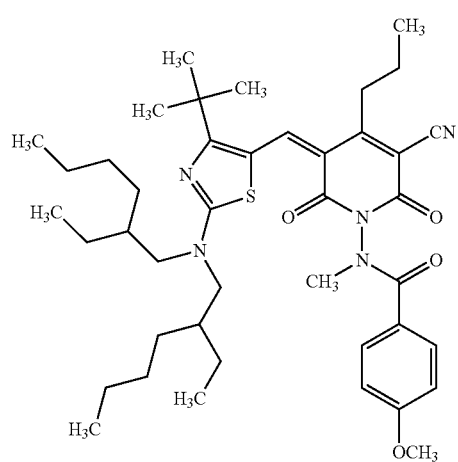
Compound (18)
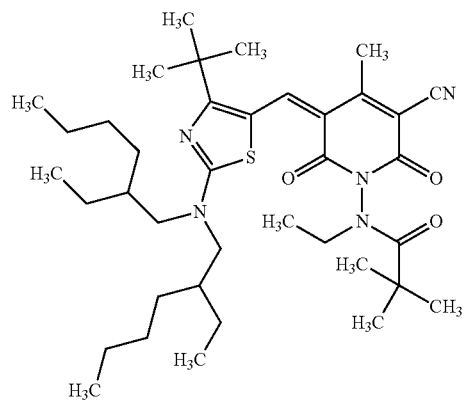
-continued
Compound (19)
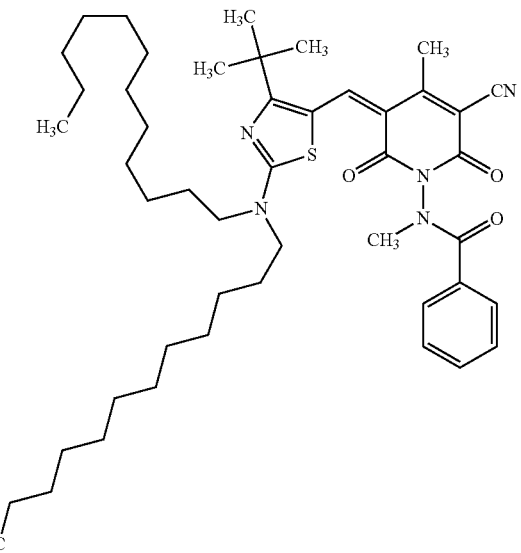
Compound (20)
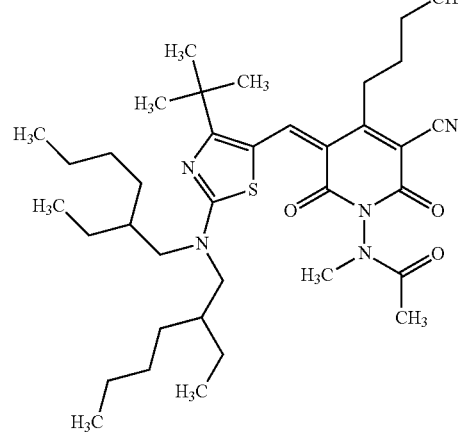
Compound (21)
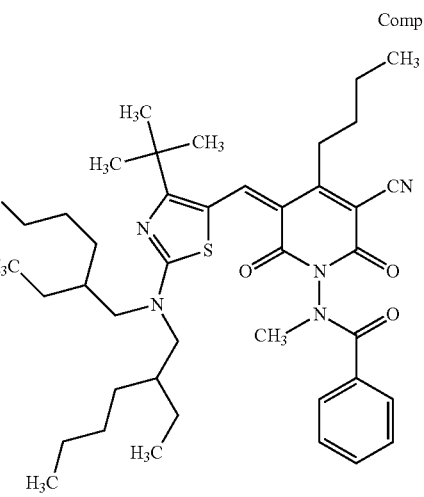

Compound (22)
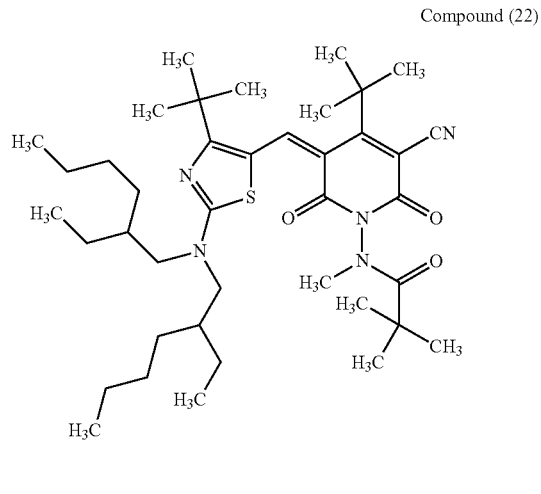
Compound (23)
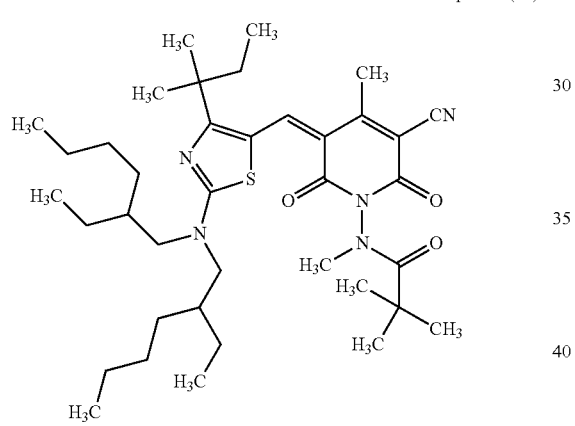
Compound (24)
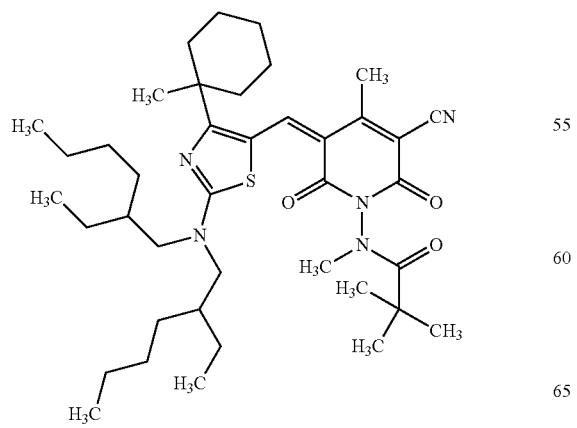
Compound (25)
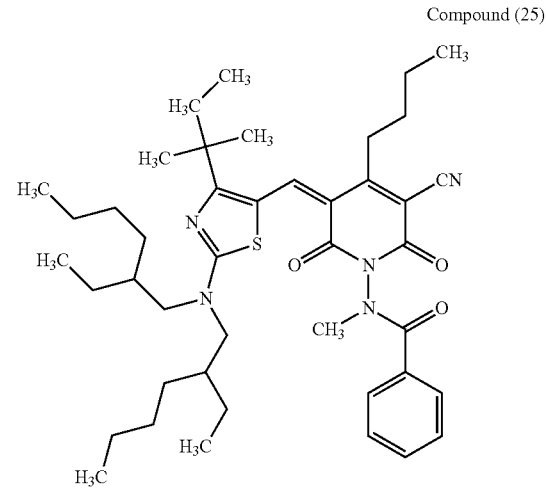
Compound (26)
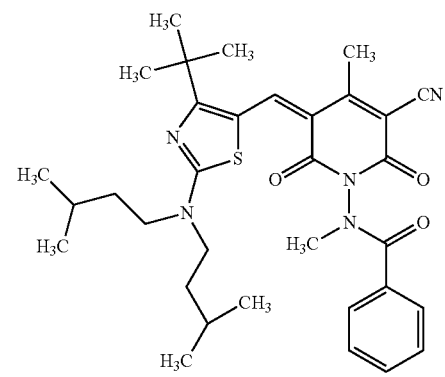
Compound (27)
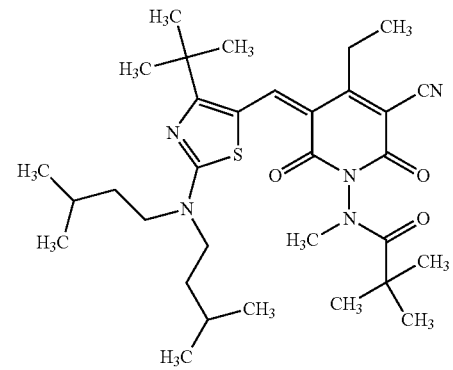

Compound (28)

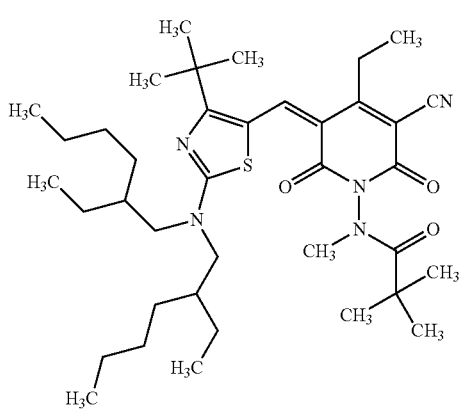

Compound (29)

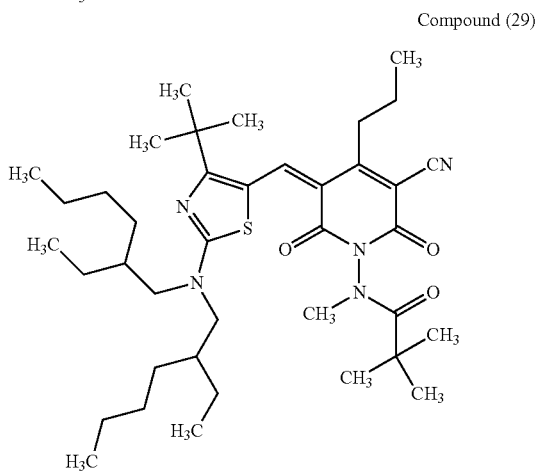

Among these compounds, the compounds (1), (3), (4), (11), (12), (13), (16), (21), (22), (26), (28), and (29) are preferably included in the magenta dye, and the compounds (3), (4), (11), (12), (13), (21), (28), and (29) are particularly preferably included in the magenta dye in order to increase chroma, further widen color gamut, and further improve lightfastness.

Yellow Dye

The yellow dye represented by General Formula (2) is described below.

General Formula (2)

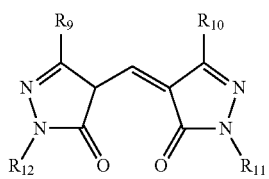

[In General Formula (2), $R_9$ to $R_{12}$ each independently represent an alkyl group, an aryl group having no substituents, or an aryl group having a substituent]

When $R_9$ to $R_{12}$ in General Formula (2) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_9$ to $R_{12}$ in General Formula (2) represent an aryl group, examples of the aryl group include, but are not particularly limited to, a phenyl group and a naphthyl group. In particular, a phenyl group is preferably used in order to further widen color gamut and further improve lightfastness. The aryl group may have a substituent such as an alkyl group.

Preferred examples of the compound represented by General Formula (2) according to the present invention include, but are not limited to, the compounds (30) to (37) below.

Compound (30)

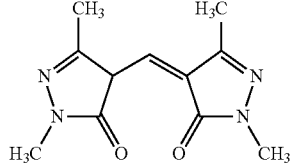

Compound (31)

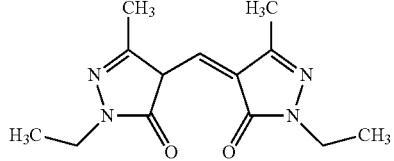

Compound (32)

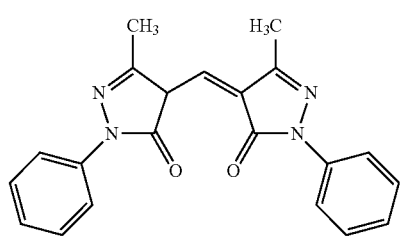

Compound (33)

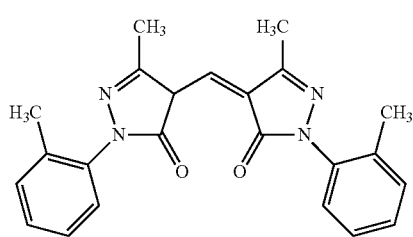

Compound (34)

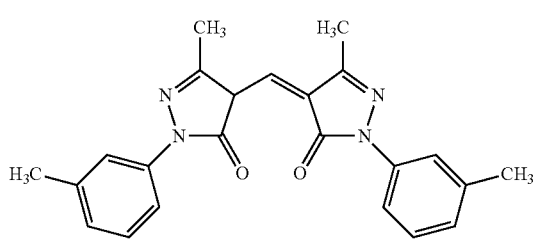

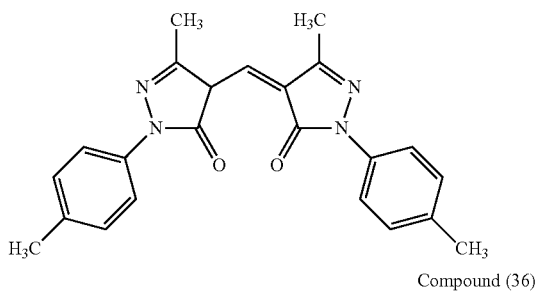

Compound (35)

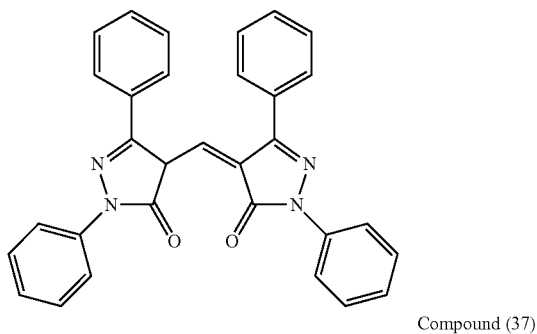

Compound (36)

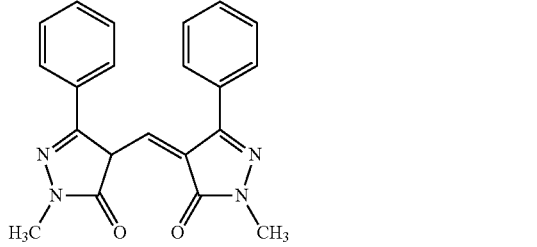

Compound (37)

Among these compounds, the compounds (32), (33), (34), and (35) are preferably included in the yellow dye, and the compound (32) is particularly preferably included in the yellow dye in order to widen color gamut and improve lightfastness.

The yellow dye represented by General Formula (3) is described below.

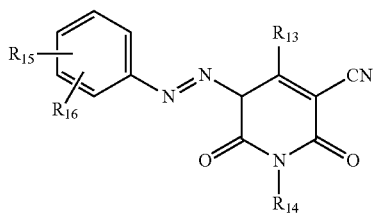

General Formula (3)

[In General Formula (3), $R_{13}$ and $R_{14}$ each independently represent an alkyl group, an aryl group having no substituents, or an aryl group having a substituent; and $R_{15}$ and $R_{16}$ each independently represent a hydrogen atom, an alkyl group, an aryl group having no substituents, an aryl group having a substituent, an alkoxy group, a cyano group, or a halogen atom]

When $R_{13}$ and $R_{14}$ in General Formula (3) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methyl-cyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{13}$ and $R_{14}$ in General Formula (3) represent an aryl group, examples of the aryl group include, but are not particularly limited to, a phenyl group and a naphthyl group. In particular, a phenyl group is preferably used in order to further widen color gamut and further improve lightfastness.

When $R_{15}$ and $R_{16}$ in General Formula (3) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methyl-cyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{15}$ and $R_{16}$ in General Formula (3) represent an aryl group, examples of the aryl group include, but are not particularly limited to, a phenyl group and a naphthyl group. In particular, a phenyl group is preferably used in order to further widen color gamut and further improve lightfastness.

When $R_{15}$ and $R_{16}$ in General Formula (3) represent an alkoxy group, examples of the alkoxy group include, but are not particularly limited to, a methoxy group, an ethoxy group, a propoxy group, and a butoxy group. In particular, a methoxy group is preferably used in order to further widen color gamut and further improve lightfastness.

When $R_{15}$ and $R_{16}$ in General Formula (3) represent a halogen atom, examples of the halogen atom include, but are not particularly limited to, a chlorine atom, a bromine atom, and an iodine atom.

Preferred examples of the compound represented by General Formula (3) according to the present invention include, but are not limited to, the compounds (38) to (42) below.

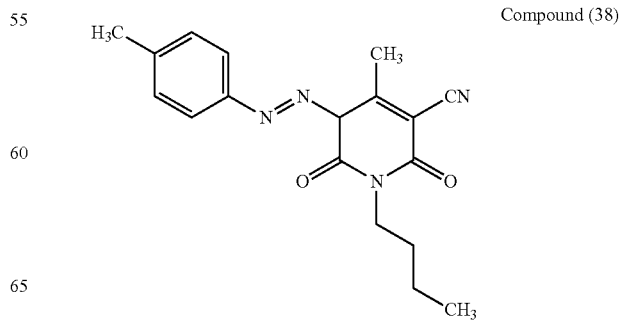

Compound (38)

-continued

Compound (39)

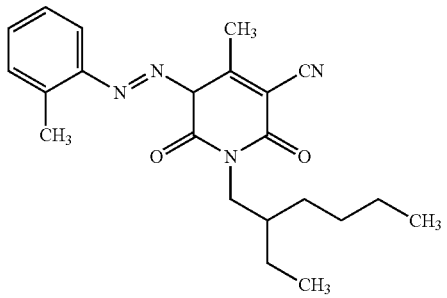

Compound (40)

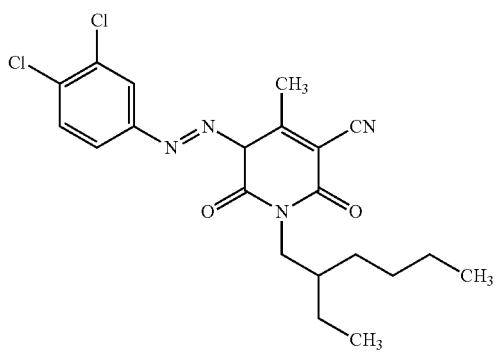

Compound (41)

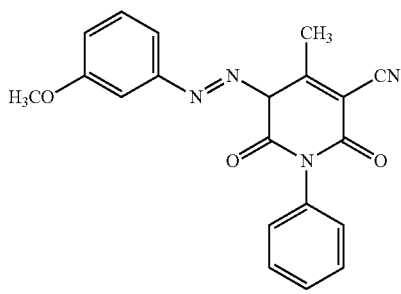

Compound (42)

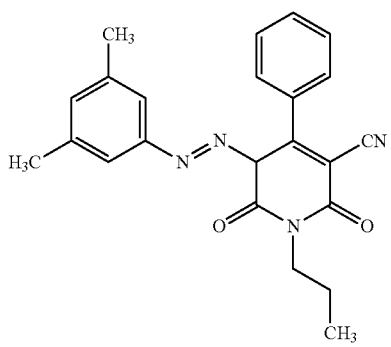

Among these compounds, the compounds (38), (39), and (41) are preferably included in the yellow dye, and the compounds (38) and (39) are particularly preferably included in the yellow dye in order to widen color gamut and improve lightfastness.

The yellow dye represented by General Formula (4) is described below.

General Formula (4)

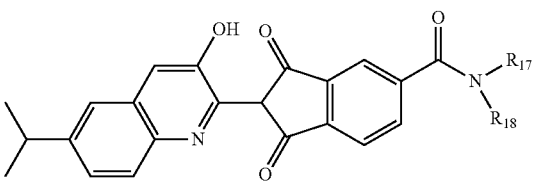

[In General Formula (4), $R_{17}$ and $R_{18}$ each independently represent an alkyl group, an aryl group having no substituents, or an aryl group having a substituent]

When $R_{17}$ and $R_{18}$ in General Formula (4) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{17}$ and $R_{18}$ in General Formula (4) represent an aryl group, examples of the aryl group include, but are not particularly limited to, a phenyl group and a naphthyl group. In particular, a phenyl group is preferably used in order to further widen color gamut and further improve lightfastness.

Preferred examples of the compound represented by General Formula (4) according to the present invention include, but are not limited to, the compounds (43) to (48) below.

Compound (43)

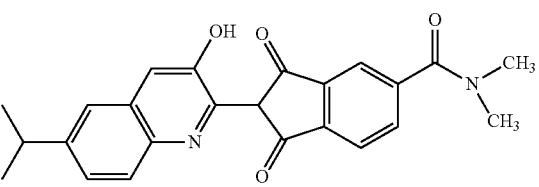

Compound (44)

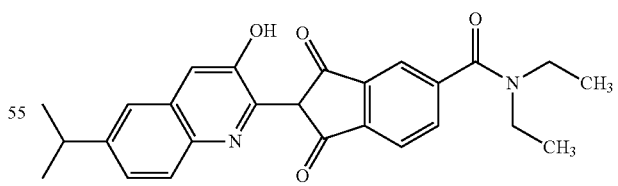

Compound (45)

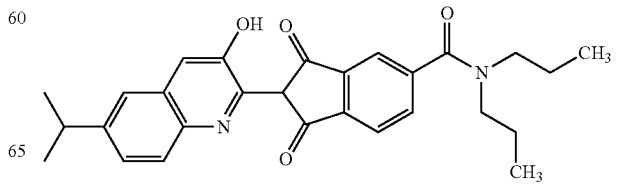

Compound (46)

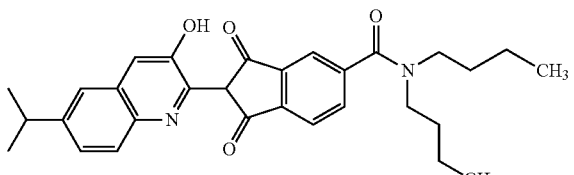

Compound (47)

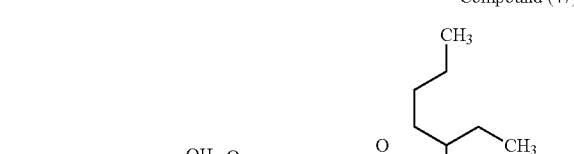

Compound (48)

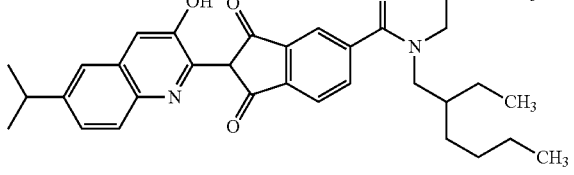

Among these compounds, the compounds (45), (46), and (47) are preferably included in the yellow dye, and the compound (46) is particularly preferably included in the yellow dye in order to widen color gamut and improve lightfastness.

The yellow dye represented by General Formula (5) is described below.

General Formula (5)

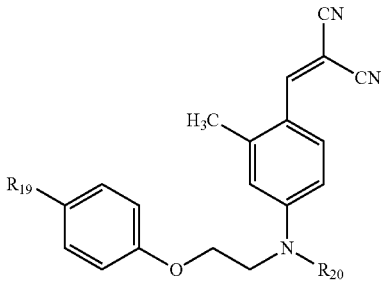

[In General Formula (5), $R_{19}$ and $R_{20}$ each independently represent an alkyl group, an aryl group having no substituents, or an aryl group having a substituent]

When $R_{19}$ and $R_{20}$ in General Formula (5) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{19}$ and $R_{20}$ in General Formula (5) represent an aryl group, examples of the aryl group include, but are not particularly limited to, a phenyl group and a naphthyl group. In particular, a phenyl group is preferably used in order to further widen color gamut and further improve lightfastness.

Preferred examples of the compound represented by General Formula (5) according to the present invention include, but are not limited to, the compounds (49) to (53) below.

Compound (49)

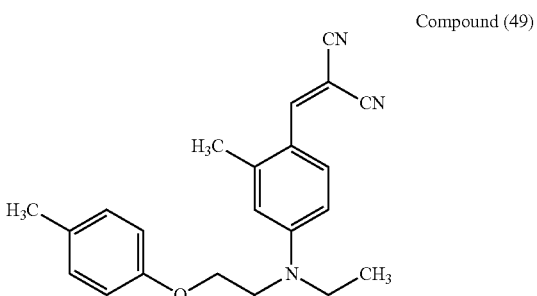

Compound (50)

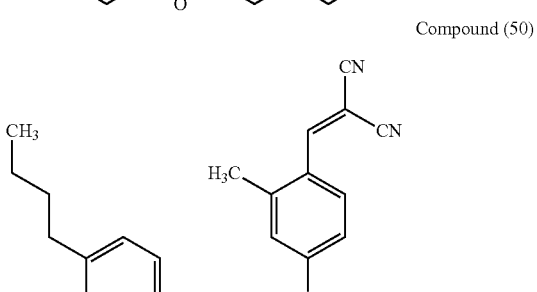

Compound (51)

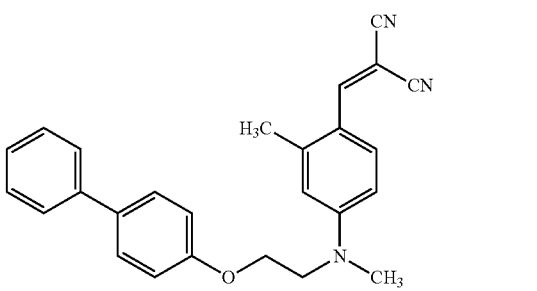

Compound (52)

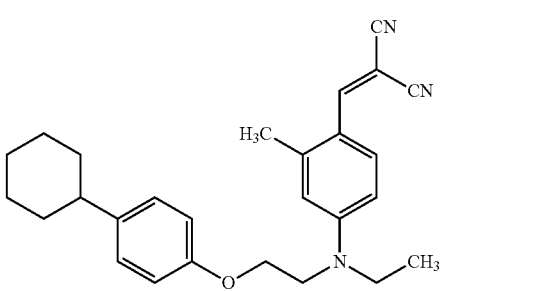

-continued

Compound (53)

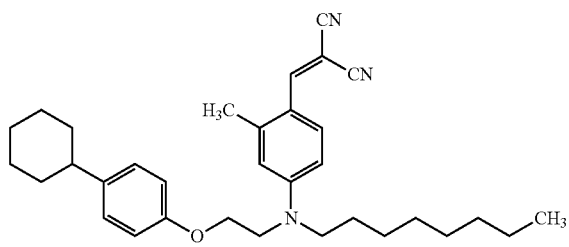

Among these compounds, the compounds (52) and (53) are preferably included in the yellow dye, and the compound (52) is particularly preferably included in the yellow dye in order to widen color gamut and improve lightfastness.

Existing yellow dyes may also be used for preparing yellow. Examples of such yellow dyes include, but are not limited to, the compounds (109) and (110) below.

Compound (109)

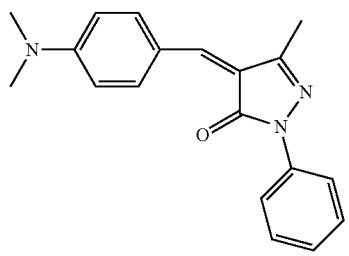

Compound (110)

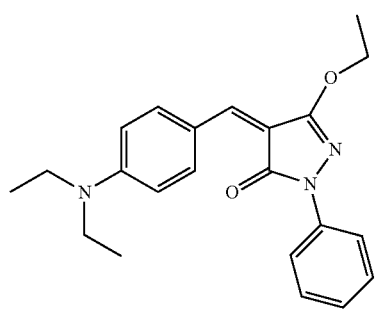

Cyan Dye

The cyan dye represented by General Formula (6) is described below.

General Formula (6)

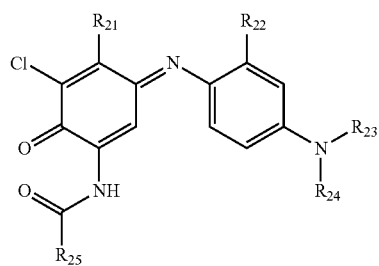

[In General Formula (6), $R_{21}$ to $R_{25}$ each independently represent an alkyl group, an aryl group having no substituents, or an aryl group having a substituent]

When $R_{21}$ to $R_{25}$ in General Formula (6) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{21}$ to $R_{25}$ in General Formula (6) represent an aryl group, examples of the aryl group include, but are not particularly limited to, a phenyl group and a naphthyl group. In particular, a phenyl group is preferably used in order to further widen color gamut and further improve lightfastness.

Preferred examples of the compound represented by General Formula (6) according to the present invention include, but are not limited to, the compounds (54) to (60) below.

Compound (54)

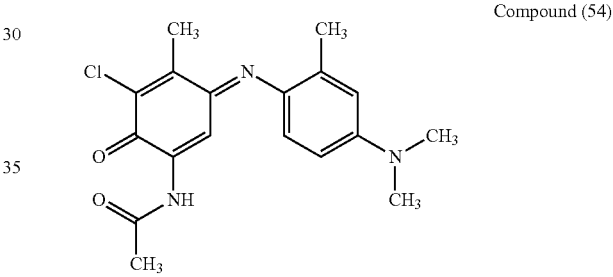

Compound (55)

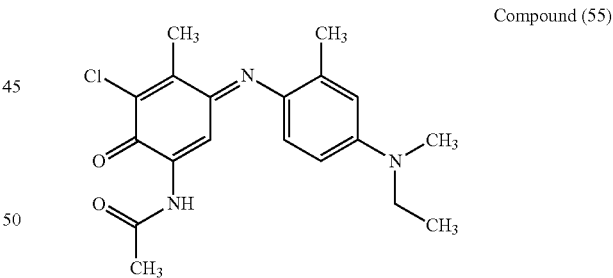

Compound (56)

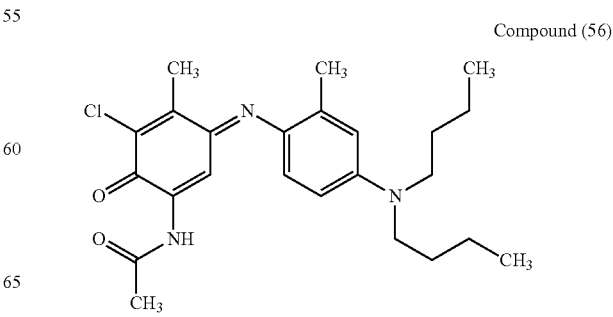

-continued

Compound (57)
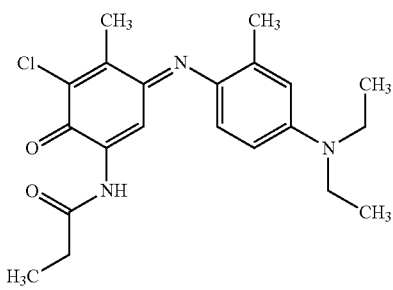

Compound (58)
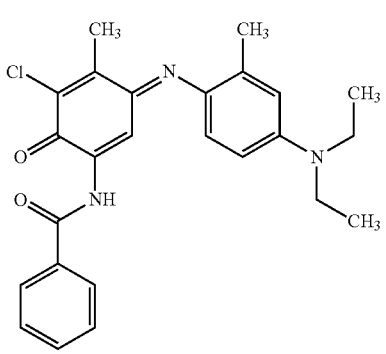

Compound (59)
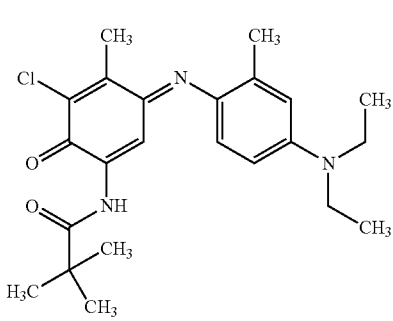

Compound (60)
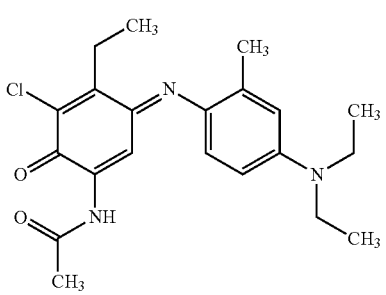

Among these compounds, the compounds (54), (55), and (56) are preferably included in the cyan dye, and the compound (55) is particularly preferably included in the cyan dye in order to widen color gamut and improve lightfastness.

The cyan dye represented by General Formula (7) is described below.

General Formula (7)
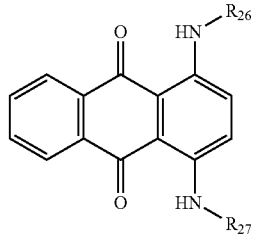

[In General Formula (7), $R_{26}$ and $R_{27}$ each independently represent an alkyl group, an aryl group having no substituents, or an aryl group having a substituent]

When $R_{26}$ and $R_{27}$ in General Formula (7) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{26}$ and $R_{27}$ in General Formula (7) represent an aryl group, examples of the aryl group include, but are not particularly limited to, a phenyl group and a naphthyl group. In particular, a phenyl group is preferably used in order to further widen color gamut and further improve lightfastness. The aryl group may have a substituent such as an alkyl group.

Preferred examples of the compound represented by General Formula (7) according to the present invention include, but are not limited to, the compounds (61) to (66) below.

Compound (61)
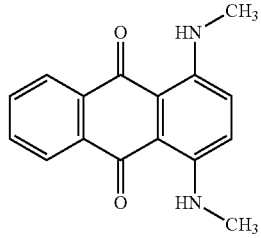

Compound (62)
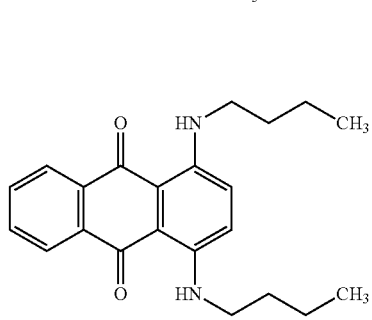

Compound (63)

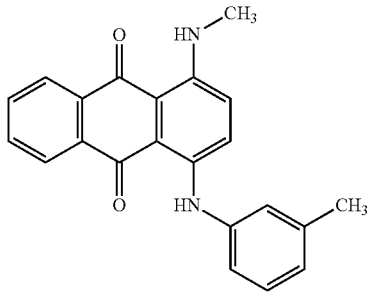

Compound (64)

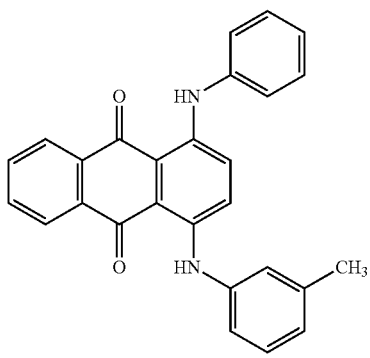

Compound (65)

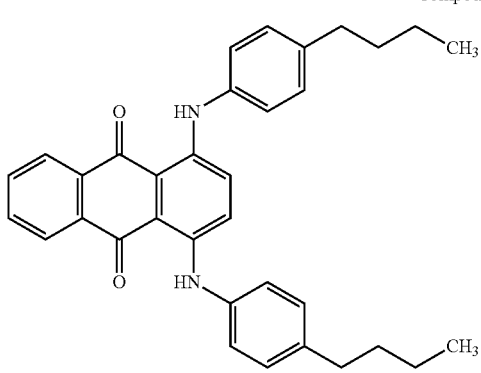

Compound (66)

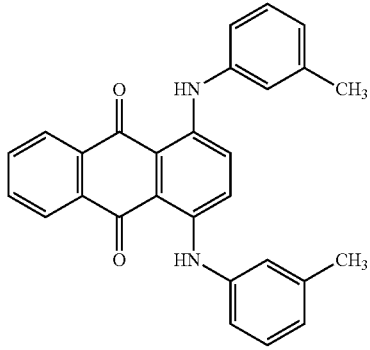

Among these compounds, the compounds (62), (63), and (64) are preferably included in the cyan dye, and the compound (63) is particularly preferably included in the cyan dye in order to widen color gamut and improve lightfastness.

The cyan dye represented by General Formula (8) is described below.

General Formula (8)

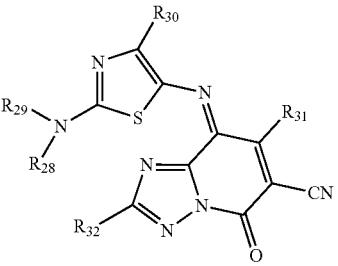

[In General Formula (8), $R_{28}$ to $R_{32}$ each independently represent an alkyl group, an aryl group having no substituents, or an aryl group having a substituent]

When $R_{28}$ to $R_{32}$ in General Formula (8) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{28}$ to $R_{32}$ in General Formula (8) represent an aryl group, examples of the aryl group include, but are not particularly limited to, a phenyl group and a naphthyl group. In particular, a phenyl group is preferably used in order to further widen color gamut and further improve lightfastness.

Preferred examples of the compound represented by General Formula (8) according to the present invention include, but are not limited to, the compounds (67) to (72) below.

Compound (67)

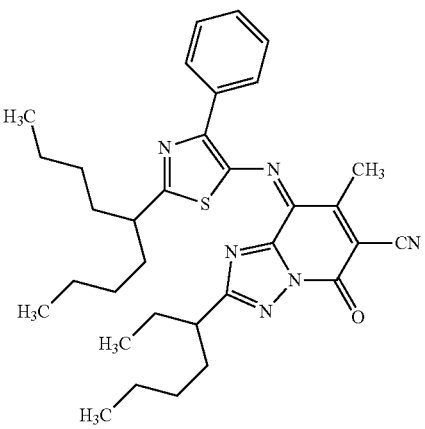

Compound (68)

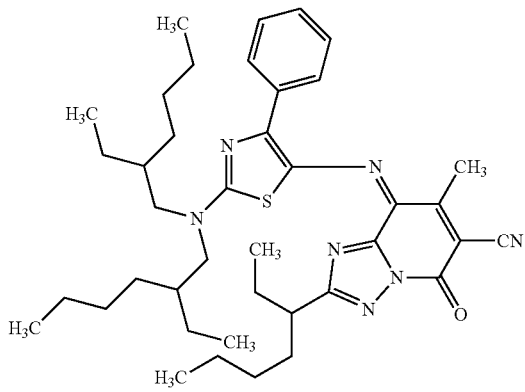

Compound (69)

Compound (70)

Compound (71)

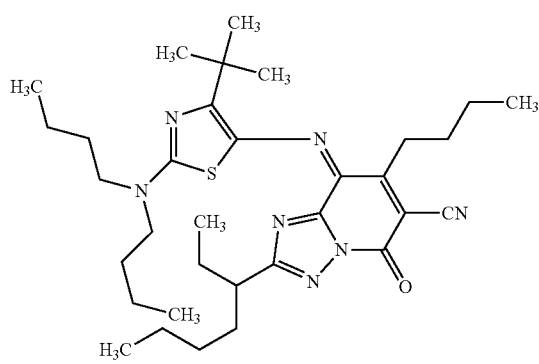

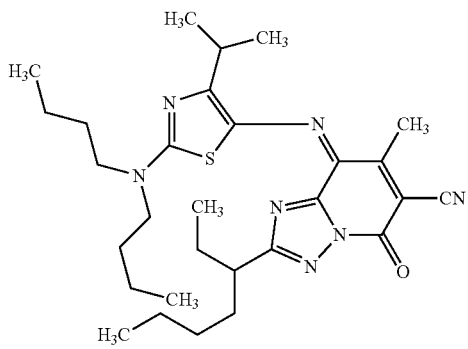

Compound (72)

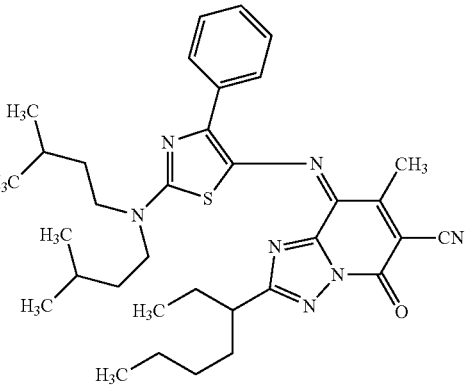

Among these compounds, the compounds (67), (68), and (72) are preferably included in the cyan dye, and the compound (67) is particularly preferably included in the cyan dye in order to widen color gamut and improve lightfastness.

Magenta Dye

The magenta dye represented by General Formula (9) is described below.

General Formula (9)

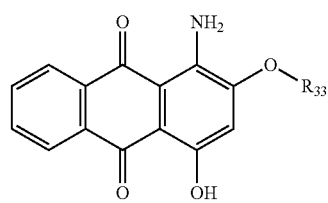

[In General Formula (9), $R_{33}$ represents an alkyl group, an aryl group having no substituents, an aryl group having a substituent, or —($R_{45}$—O)n-$R_{46}$, $R_{45}$ represents alkylene, and $R_{46}$ represents an alkyl group]

When $R_{33}$ in General Formula (9) represents an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methyl-cyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{33}$ in General Formula (9) represents an aryl group, examples of the aryl group include, but are not particularly limited to, a phenyl group and a naphthyl group. In particular, a phenyl group is preferably used in order to further widen color gamut and further improve lightfastness. The aryl group may have a substituent such as an alkyl group or an alkoxy group.

When $R_{33}$ in General Formula (9) represents a —($R_{45}$—O)n-$R_{46}$ group, the total number of carbon atoms in the —($R_{45}$—O)n-$R_{46}$ group is preferably, but not particularly limited to, 20 or less.

Preferred examples of the compound represented by General Formula (9) according to the present invention include, but are not limited to, the compounds (73) to (81) below.

Compound (73)
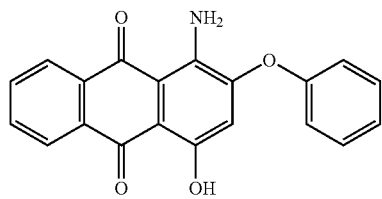

Compound (74)
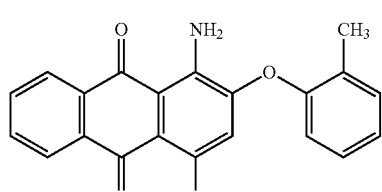

Compound (75)
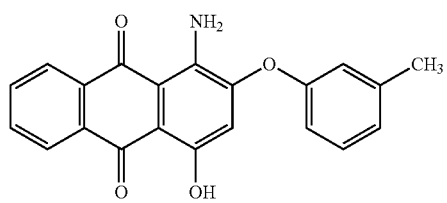

Compound (76)
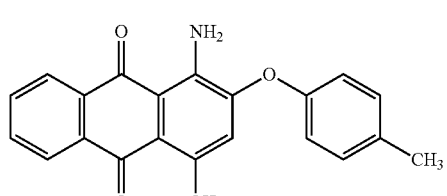

Compound (77)
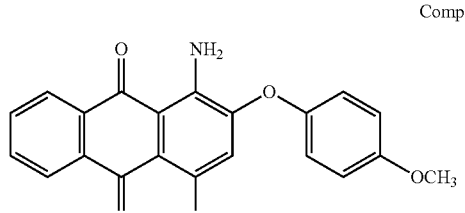

Compound (78)
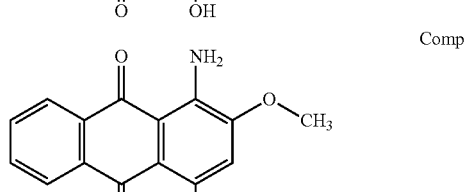

Compound (79)
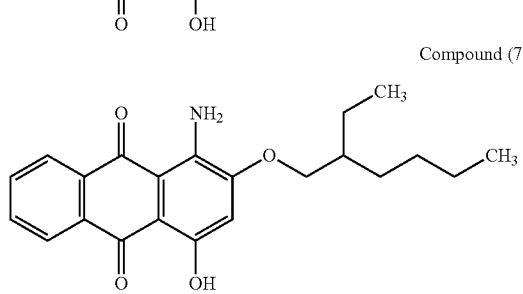

Compound (80)
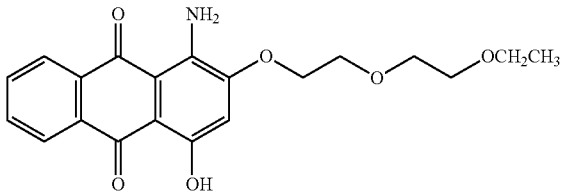

Compound (81)
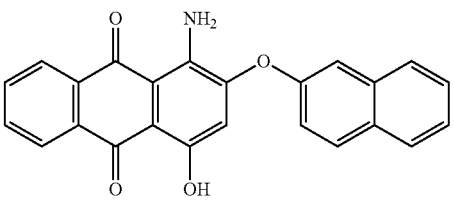

Among these compounds, the compounds (73), (74), (75), (76), and (77) are preferably included in the magenta dye, and the compounds (73) and (75) are particularly preferably included in the magenta dye in order to widen color gamut and improve lightfastness.

The magenta dye represented by General Formula (10) is described below.

General Formula (10)
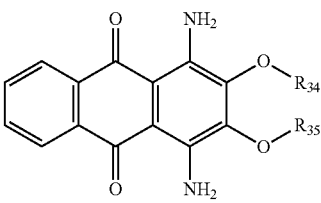

[In General Formula (10), $R_{34}$ and $R_{35}$ each independently represent an alkyl group, an aryl group having no substituents, or an aryl group having a substituent]

When $R_{34}$ and $R_{35}$ in General Formula (10) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{34}$ and $R_{35}$ in General Formula (10) represent an aryl group, examples of the aryl group include, but are not particularly limited to, a phenyl group and a naphthyl group. In particular, a phenyl group is preferably used in order to further widen color gamut and further improve lightfastness. The aryl group may have a substituent such as an alkyl group.

Preferred examples of the compound represented by General Formula (10) according to the present invention include, but are not limited to, the compounds (82) to (90) below.

Compound (82)
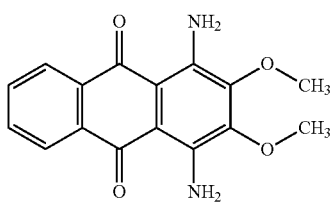

Compound (83)
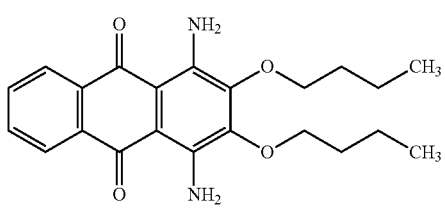

Compound (84)
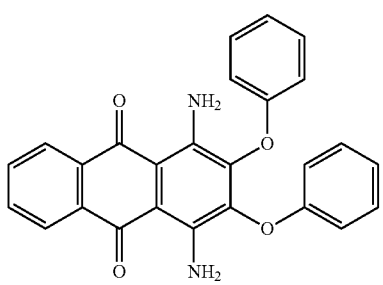

Compound (85)
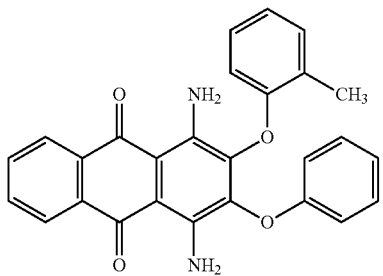

Compound (86)
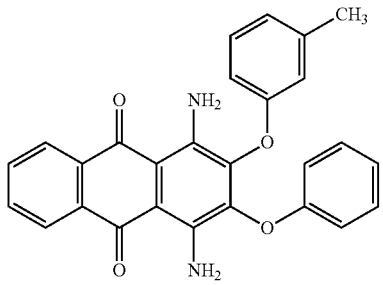

Compound (87)
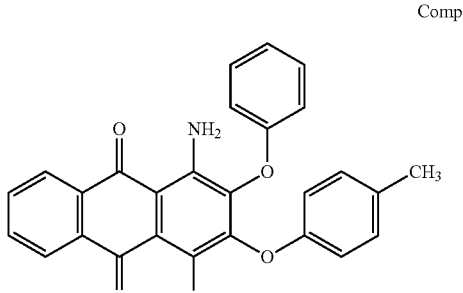

-continued

Compound (88)
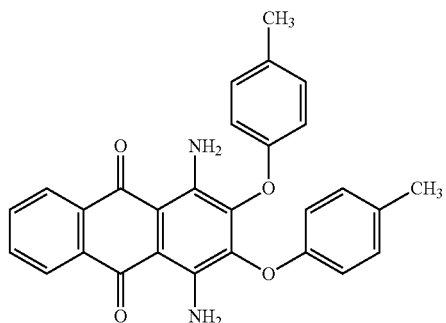

Compound (89)
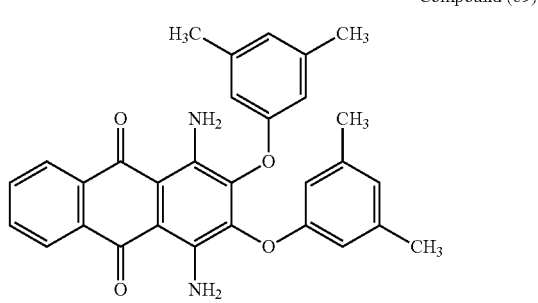

Compound (90)
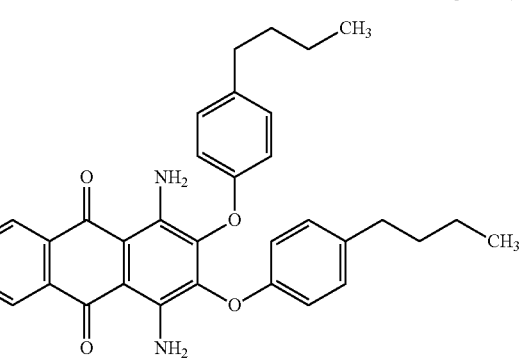

Among these compounds, the compounds (84), (85), (86), (87), (88), and (89) are preferably included in the magenta dye, and the compounds (84), (88), and (89) are particularly preferably included in the magenta dye in order to widen color gamut and improve lightfastness.

The magenta dye represented by General Formula (11) is described below.

General Formula (11)
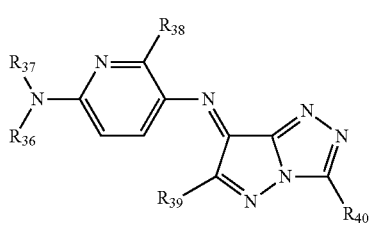

[In General Formula (11), $R_{36}$ to $R_{40}$ each independently represent an alkyl group, an aryl group having no substituents, or an aryl group having a substituent]

When $R_{36}$ to $R_{40}$ in General Formula (11) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{36}$ to $R_{40}$ in General Formula (11) represent an aryl group, examples of the aryl group include, but are not particularly limited to, a phenyl group and a naphthyl group. In particular, a phenyl group is preferably used in order to further widen color gamut and further improve lightfastness. The aryl group may have a substituent such as an alkyl group or an alkoxy group.

Preferred examples of the compound represented by General Formula (11) according to the present invention include, but are not limited to, the compounds (91) to (99) below.

Compound (91)

Compound (92)

Compound (93)

Compound (94)

Compound (95)

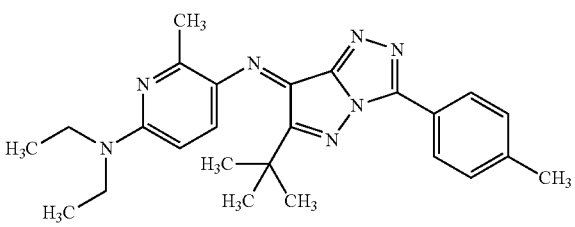

Compound (96)

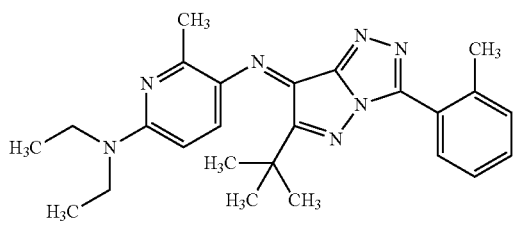

Compound (97)

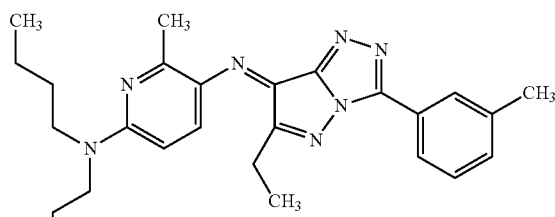

Compound (98)

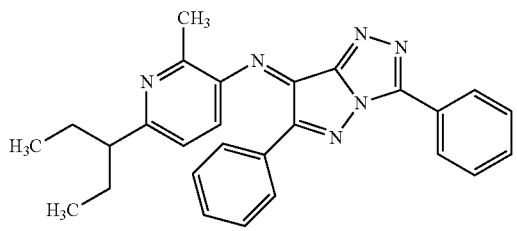

Compound (99)

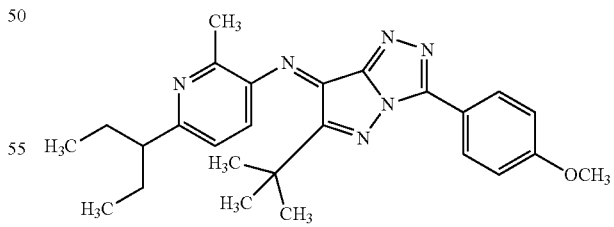

Among these compounds, the compounds (93), (94), (95), (96), and (97) are preferably included in the magenta dye, and the compounds (94), (95), and (96) are particularly preferably included in the magenta dye in order to widen color gamut and improve lightfastness.

The magenta dye represented by General Formula (12) is described below.

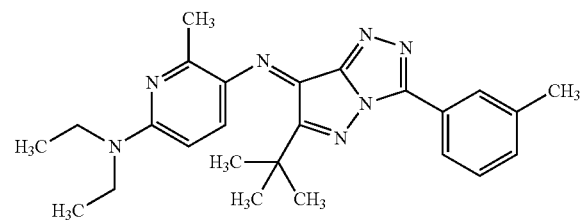

General Formula (12)

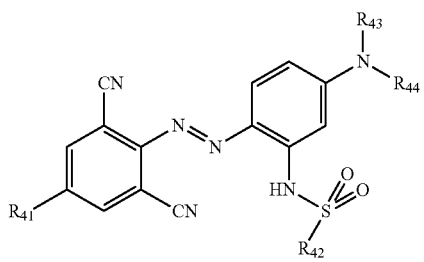

[In General Formula (12), $R_{41}$ to $R_{44}$ each independently represent an alkyl group, an aryl group having no substituents, or an aryl group having a substituent]

When $R_{41}$ to $R_{44}$ in General Formula (12) represent an alkyl group, examples of the alkyl group include, but are not particularly limited to, linear, branched, or cyclic primary to tertiary alkyl groups having 1 to 20 carbon atoms. Specific examples of such alkyl groups include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methyl-cyclohexyl group, a 2-ethylpropyl group, and a 2-ethylhexyl group. In particular, an alkyl group having 1 or 2 carbon atoms, such as a methyl group or an ethyl group, is preferably used in order to further widen color gamut and further improve lightfastness.

When $R_{41}$ to $R_{44}$ in General Formula (12) represent an aryl group, examples of the aryl group include, but are not particularly limited to, a phenyl group and a naphthyl group. In particular, a phenyl group is preferably used in order to further widen color gamut and further improve lightfastness. The aryl group may have a substituent such as an alkyl group.

Preferred examples of the compound represented by General Formula (12) according to the present invention include, but are not limited to, the compounds (100) to (108) below.

Compound (100)

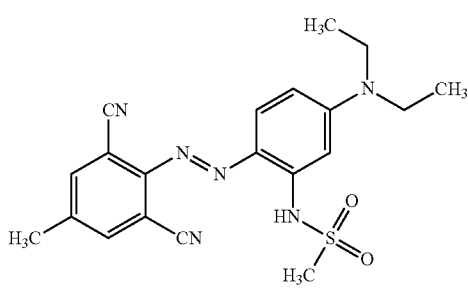

Compound (101)

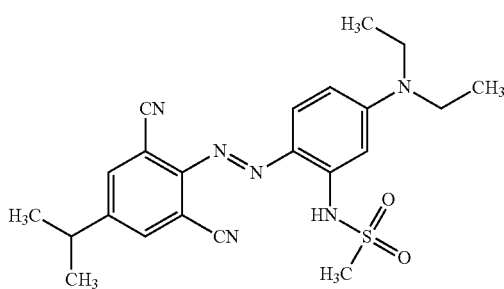

Compound (102)

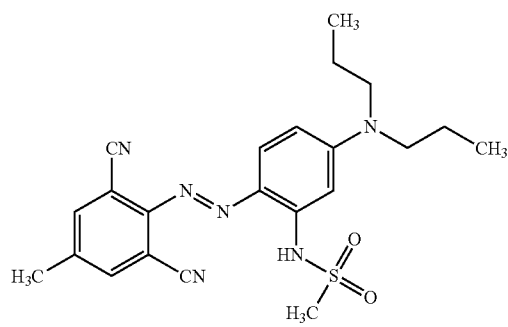

Compound (103)

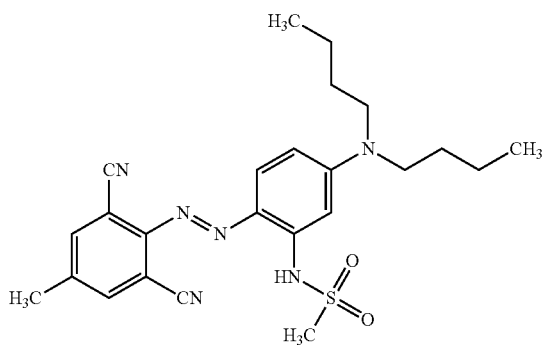

Compound (104)

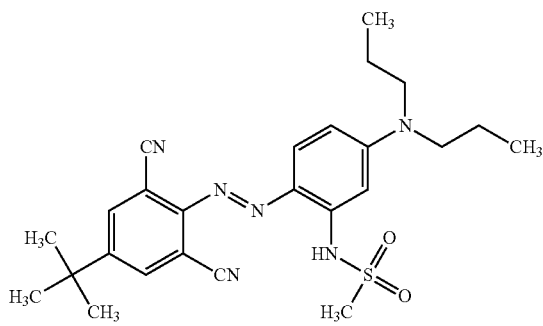

Compound (105)

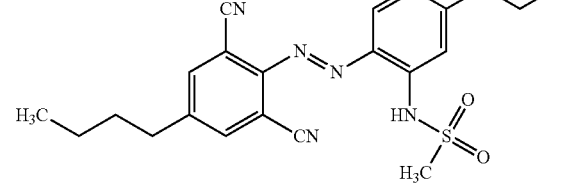

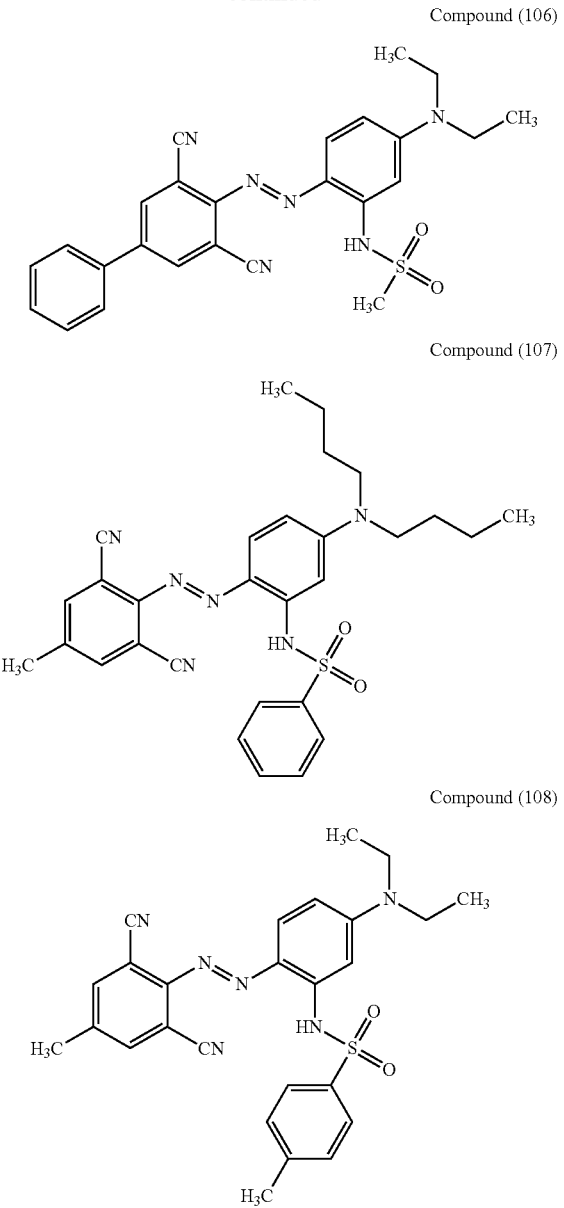

Compound (106)
Compound (107)
Compound (108)

Among these compounds, the compounds (100), (102), (103), and (104) are preferably included in the magenta dye, and the compound (102) is particularly preferably included in the magenta dye in order to widen color gamut and improve lightfastness.

Thermal Transfer Recording Sheet

The thermal transfer recording sheet according to the present invention includes a base material and a colorant layer disposed on the base material. The colorant layer is constituted by a yellow dye layer including a yellow dye, a magenta dye layer including a magenta dye, and a cyan dye layer including a cyan dye.

Images can be formed using the thermal transfer recording sheet in the following manner. The thermal transfer recording sheet is superimposed on an image-receiving sheet including a colorant-receiving layer disposed thereon. The colorant included in the thermal transfer recording sheet is sublimated when the thermal transfer recording sheet is heated using heating means such as a thermal head and thereby transferred to the image-receiving sheet.

In general, the thermal transfer recording sheet is produced in the following manner. However, a method for producing the thermal transfer recording sheet according to the present invention is not particularly limited.

A colorant including the specific dyes according to the present invention, a binder resin, and, as needed, a surfactant and wax are gradually added to a medium under stirring so as to be uniformly mixed with the medium. These compositions are subjected to a mechanical sharing force using a dispersing machine so as to be stably dissolved or dispersed in the form of fine particles. Thus, an ink is prepared. The ink is applied to a base film, which serves as a base material. The deposited ink is dried to prepare a colorant layer on the base material. Examples of the dispersing machine used for dispersing the above-described compositions include, but are not particularly limited to, medium-type dispersing machines such as a rotational shear-type homogenizer, a ball mill, a sand mill, and Attritor and high-pressure opposed-collision-type homogenizers.

Optionally, the transferable protection layer and heat-resistant lubricity layer described below and the like may be provided. Thus, the thermal transfer recording sheet according to the present invention is prepared. However, the thermal transfer recording sheet according to the present invention is not limited to a thermal transfer recording sheet prepared by the above-described production method.

The structure of the thermal transfer recording sheet according to the present invention is described in detail below.

Colorant

The thermal transfer recording sheet according to the present invention includes a colorant layer including at least one compound represented by General Formula (1) as a magenta dye, at least one compound selected from the group consisting of compounds represented by General Formulae (2) to (5) as a yellow dye, and at least one compound selected from the group consisting of compounds represented by General Formulae (6) to (8) as a cyan dye.

At least one compound selected from the group consisting of compounds represented by General Formulae (9) to (12) may be used in combination with the above-described compound serving as a magenta dye as long as the advantageous effects of the thermal transfer recording sheet according to the present invention are not impaired.

Publicly known dyes that are used for thermal transferring in the related art and that undergo sublimation migration when being heated may also be used in combination with the above-described dyes. The types of such dyes are not particularly limited and selected appropriately in consideration of hue, print sensitivity, lightfastness, preservability, binder solubility, and the like.

For each color, the amount of colorant used in the present invention is preferably 1 to 50 parts by mass relative to 100 parts by mass of the binder resin. The amount of colorant used in the present invention is more preferably 3 to 20 parts by mass relative to 100 parts by mass of the binder resin from the viewpoint of dispersion of coloring agents. In the case where two or more dyes are used in a mixture, the expression "the amount of colorant used" translates into the total amount of the dye coloring matters used.

Binder Resin

Various resins may be used as a binder resin for producing the thermal transfer recording sheet in the present invention. In particular, water soluble resins such as a cellulose resin, a polyacrylic acid resin, a starch resin, and an epoxy resin; and organic-solvent soluble resins such as a polyacrylate resin, a polymethacrylate resin, a polystyrene resin, a polycarbonate resin, a polyethersulfone resin, a polyvinyl butyral resin, an ethylcellulose resin, an acetylcellulose resin, a polyester resin, an AS resin, and a phenoxy resin are preferably used. These resins may be used alone or, as needed, in combination of two or more.

Surfactant

A surfactant may be added to the thermal transfer recording sheet according to the present invention in order to increase lubricity in a condition where the thermal head is heated (i.e., during printing). Examples of the surfactant that can be added include a cationic surfactant, an anionic surfactant, and a nonionic surfactant.

Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include fatty acid soaps such as sodium stearate and sodium dodecanoate, sodium dodecyl sulfate, sodium dodecylbenzene sulfate, and sodium lauryl sulfate.

Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

Wax

A wax may be added to the thermal transfer recording sheet according to the present invention in order to increase lubricity in a condition where the thermal head is not heated. Examples of the wax that can be added include, but are not particularly limited to, a polyethylene wax, a paraffin wax, and a fatty acid ester wax.

In addition to the above-described additives, optionally, an ultraviolet absorber, a preservative, an antioxidant, an antistatic agent, and a viscosity modifier may be added to the thermal transfer recording sheet according to the present invention.

Examples of the medium that can be used for producing the thermal transfer recording sheet according to the present invention include, but are not particularly limited to, water and organic solvents. Examples of the organic solvents include alcohols such as methanol, ethanol, isopropanol, and isobutanol; cellosolves such as methyl cellosolve and ethyl cellosolve; aromatic hydrocarbons such as toluene, xylene, and chlorobenzene; esters such as ethyl acetate and butyl acetate; ketones such as acetone, methyl ethyl ketone, methyl isobutyl ketone, and cyclohexanone; halogenated hydrocarbons such as methylene chloride, chloroform, and trichloroethylene; ethers such as tetrahydrofuran and dioxane; N,N-dimethylformamide; and N-methylpyrrolidone. These organic solvents may be used alone or, as needed, in combination of two or more.

Base Material, Colorant Layer, and Other Layers

The base material constituting the thermal transfer recording sheet according to the present invention supports the colorant layer described below. Any publicly known base material may be used. Examples of the base material include a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, cellophane, a cellulose derivative, a polyethylene film, a polyvinyl chloride film, a nylon film, condenser paper, and paraffin paper. However, examples of the base material are not limited, and any publicly known base material having certain heat resistance and a certain strength may be used. In particular, a polyethylene terephthalate film is preferably used from the viewpoints of mechanical strength, resistance to solvents, and economy.

The thickness of the base material is 0.5 to 50 μm and is further preferably 3 to 10 μm from the viewpoint of transferability.

In general, when the base material is coated with an ink containing dyes in order to form a dye layer, the wettability, adhesion, and the like of the coating liquid are likely to be insufficient. Therefore, it is preferable that one or both sides of the base material are subjected to an adhesive treatment as needed.

Examples of the adhesive treatment include, but are not particularly limited to, an ozone treatment, a corona discharge treatment, an ultraviolet treatment, a plasma treatment, a low-temperature plasma treatment, a primer treatment, and a chemical treatment. These treatments may be performed in combination of two or more.

In the adhesive treatment of the base material, an adhesive layer may be deposited on the base material by coating.

Examples of a material of the adhesive layer include, but are not particularly limited to, organic materials such as a polyester resin, a polystyrene resin, a polyacrylic ester resin, a polyamide resin, a polyether resin, a polyvinyl acetate resin, a polyethylene resin, a polypropylene resin, a polyvinyl chloride resin, a polyvinyl alcohol resin, and a polyvinyl butyral resin; and inorganic fine particles such as silica particles, alumina particles, magnesium carbonate particles, magnesium oxide particles, and titanium oxide particles.

The above-described materials can be applied to the base material by using, for example, a bar coater, a gravure coater, a reverse roll coater, a rod coater, or an air doctor coater. However, the coating method is not particularly limited. In particular, a gravure coater is preferably used.

In the step of drying the resulting coating film, the coating film is preferably dried at 50° C. to 120° C. for about 1 second to about 5 minutes. However, the drying temperature and the drying time are not particularly limited. If the deposited film is not sufficiently dried, scumming may occur. Furthermore, the dye ink may cause set-off when the thermal transfer recording sheet is wound, which results in occurrence of kickback, which is a phenomenon in which the transferred dye ink is again transferred to another dye layer having a different hue when the thermal transfer recording sheet is rewound.

From the viewpoint of transferability, the amount of ink composition deposited on the base film is preferably controlled so that the thickness of the colorant layer is 0.1 to 5 μm after being dried.

The thermal transfer recording sheet according to the present invention, which includes at least a yellow layer, a magenta layer, and a cyan layer, may optionally include a black dye layer that is publicly known in the related art. Although a method for forming the colorant layers on the base material is not particularly limited, in the thermal transfer recording sheet according to the present invention, the colorant layers are each formed on the base material by a frame sequential method. For example, the yellow dye layer, the magenta dye layer, the cyan dye layer, and the black dye layer may be formed repeatedly on the base sheet in the direction in which the base sheet is transported. In the case where such a thermal transfer sheet is used, a yellow image, a magenta image, a cyan image, and a black image are sequentially formed in order to form one full-color image, and the sequence of images is formed repeatedly. In addition to the plurality of dye layers, a thermal melting black layer may optionally be formed.

Heating means for heating the thermal transfer recording sheet according to the present invention in order to perform printing is not particularly limited. As well as a thermal head used in the conventional method, infrared rays and a laser beam may also be used. The thermal transfer recording sheet may also be used as an electric dye-transfer sheet including an electric heat-generating film that generates heat when current is fed through the base film.

The thermal transfer recording sheet according to the present invention may include a transfer protection layer disposed on the base material together with the above-described dye layers in a frame-sequential manner. The transfer protection layer is used for protecting the surface of the transferred image.

In order to enhance heat resistance and the mobility of the thermal head, the thermal transfer recording sheet according to the present invention preferably includes a heat-resistant lubricity layer disposed on a side of the base material which is opposite to a side on which the colorant layer is disposed. The heat-resistant lubricity layer is composed of a heat-resistant resin. Examples of the heat-resistant resin include, but are not particularly limited to, a polyvinyl butyral resin, a polyvinyl acetal resin, a polyester resin, a polyether resin, a polybutadiene resin, a vinyl chloride-vinyl acetate copolymer resin, a styrene-butadiene copolymer resin, polyurethane acrylate, polyester acrylate, a polyimide resin, and a polycarbonate resin.

A cross-linking agent, a parting agent, a lubricant, and a lubricity-imparting agent may also be added to the heat-resistant lubricity layer. Examples of the lubricant include an amino-modified silicone compound and a carboxy-modified silicone compound. Examples of the lubricity-imparting agent include heat-resistant fine particles such as silica fine particles.

The heat-resistant lubricity layer is formed by coating the base material with a heat-resistant lubricity layer coating liquid, which is prepared by dissolving or dispersing the above-described resins and additives in a solvent. The heat-resistant lubricity layer coating liquid can be applied to the base material by using, for example, a bar coater, a gravure coater, a reverse roll coater, a rod coater, or an air doctor coater. However, the coating method is not particularly limited. In particular, a gravure coater is preferably used. From the viewpoint of transferability, the amount of heat-resistant lubricity layer coating liquid deposited is preferably controlled so that the thickness of the heat-resistant lubricity layer is 0.1 to 5 μm after being dried.

EXAMPLES

The present invention is further described in detail with reference to examples and comparative examples below, but not limited to these examples. Hereinafter, "parts" and "%" are on a mass basis unless otherwise specified. Identification of the compounds prepared in the examples and was performed using an $^1$H nuclear magnetic resonance spectrometric analysis ($^1$H-NMR) system (ECA-400, produced by JEOL Ltd.) and an LC/TOF MS (LC/MSD TOF, produced by Agilent Technologies) system.

Preparation of Coloring Matter Compound Having Structure Represented by General Formula (1)

A coloring matter compound having the structure represented by General Formula (1) according to the present invention can be synthesized by a publicly known method. The compound represented by General Formula (1) according to the present invention was prepared by the method described below.

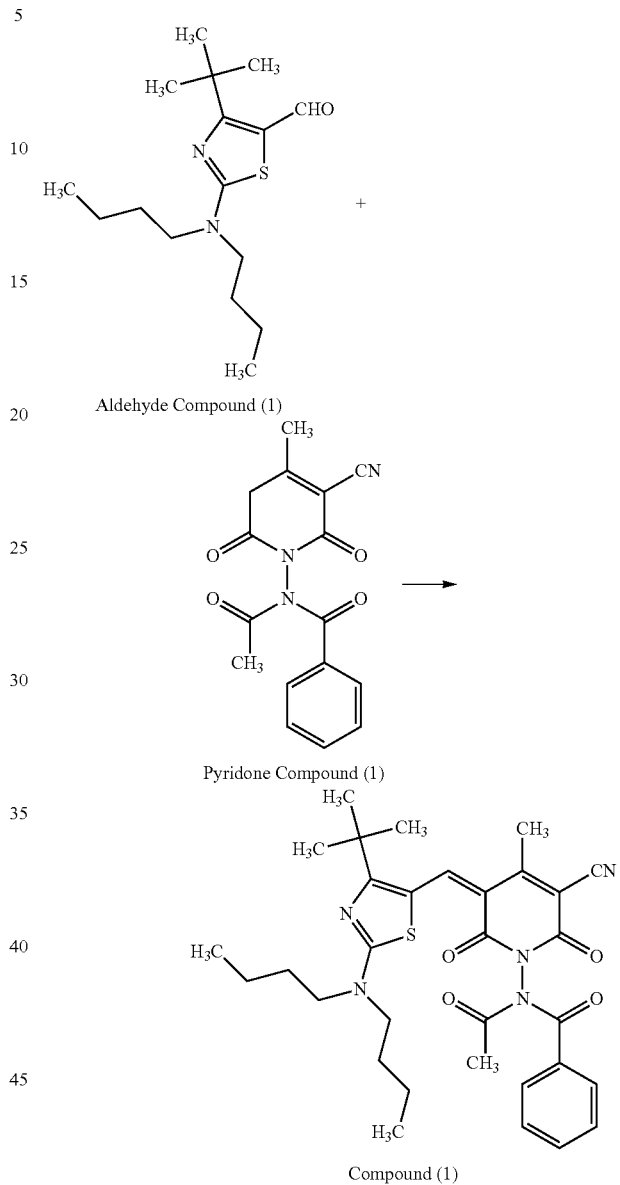

Production Example 1

Preparation of Compound (1)

To a suspension of 10 mmol of a pyridone compound (1) in 20 mL of toluene, 100 mg of p-toluenesulfonic acid was added. Then, the temperature was increased to 70° C. A solution of 10 mmol of an aldehyde compound (1) in 20 mL of toluene was added dropwise to the resulting mixture. The mixture was heated under reflux at 160° C. for 6 hours while performing azeotropic dehydration. After the reaction was completed, the temperature was reduced to room temperature. The mixture was diluted with isopropanol. The mixture was concentrated under reduced pressure, and the residue was purified by column chromatography (eluent: ethyl acetate/heptane). Thus, 4.6 g (yield: 78%) of a compound (1)

was prepared. The $^1$H-NMR spectrum of the compound (1) which was measured in CDCl$_3$ at room temperature at 400 MHz is shown below.

Results of Analysis of Compound (1)

[1] $^1$H-NMR (400 MHz, CDCl$_3$, room temperature): δ (ppm)=0.97 (3H, t, J=7.33 Hz), 1.03 (3H, t, J=7.33 Hz), 1.36 (2H, dd, J=7.33, 14.7 Hz), 1.43-1.58 (11H, m), 1.66-1.78 (4H, m), 2.48 (3H, s), 2.56 (3H, s), 3.50 (2H, t, J=7.56 Hz), 3.80 (2H, t, J=7.33 Hz), 7.34 (2H, t, J=7.56 Hz), 7.45 (1H, t, J=6.87 Hz), 7.68 (2H, d, J=8.24 Hz), 8.24 (1H, s)

[2] Mass analysis (ESI-TOF): m/z=590.2989 (M+H)$^+$

Preparation of Other Compounds

The other compounds shown in Table 1 were prepared as in Production Example 1 and identified.

Comparative Compounds

The following compounds were used as comparative compounds.

Comparative Compound (1)

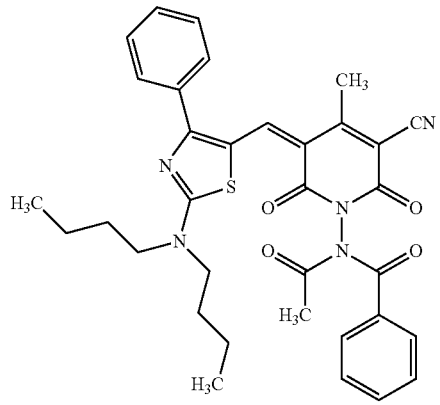

Comparative Compound (2)

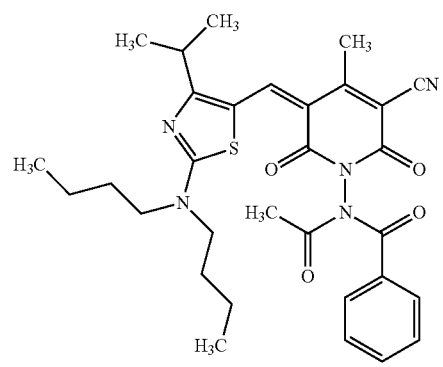

Preparation of Magenta Inks

Magenta Ink Preparation Example 1

To a mixed solution of 45 parts of methyl ethyl ketone and 45 parts of toluene, 5 parts of a polyvinyl butyral resin (KS-3, produced by SEKISUI CHEMICAL CO., LTD.) was gradually added and dissolved. In the resulting mixture, 5 parts of the compound (1) was completely dissolved. Thus, a magenta ink (M1) for thermal transfer recording sheets was prepared.

Magenta Ink Preparation Examples 2 to 22

Magenta inks (M2) to (M22) for thermal transfer recording sheets were each prepared as in Production Example 1, except that the specific magenta compounds shown in Table 1 were used instead of the compound (1) at the specific mixing ratio shown in Table 1. In the case where a plurality of colorants were used, the total amount of the colorants was controlled to be 5 parts.

TABLE 1

| | Magenta dye General Formula 1 | Magenta dye General Formula 9 | Magenta dye General Formula 10 | Magenta dye General Formula 11 | Magenta dye General Formula 12 | Mixing ratio |
|---|---|---|---|---|---|---|
| M1 | Compound (1) | | | | | 1:0:0:0:0 |
| M2 | Compound (6) | Compound (73) | Compound (89) | | | 2:1:1:0:0 |
| M3 | Compound (10) | Compound (75) | Compound (84) | Compound (94) | | 3:1:1:1:0 |
| M4 | Compound (3) | Compound (73) | Compound (89) | | | 3:2:1:0:0 |
| M5 | Compound (12) | Compound (75) | Compound (84) | Compound (94) | | 4:1:1:2:0 |
| M6 | Compound (13) | | Compound (88) | | Compound (102) | 2:0:1:0:1 |
| M7 | Compound (1) | Compound (75) | | | Compound (102) | 3:2:0:0:1 |
| M8 | Compound (22) | Compound (73) | Compound (88) | | | 3:2:1:0:0 |
| M9 | Compound (18) | Compound (75) | Compound (84) | | | 3:2:1:0:0 |
| M10 | Compound (15) | Compound (75) | Compound (84) | Compound (94) | | 3:1:1:1:0 |
| M11 | Compound (4) | Compound (73) | Compound (89) | | | 2:1:1:0:0 |
| M12 | Compound (20) | Compound (73) | Compound (84) | Compound (95) | | 4:1:1:2:0 |
| M13 | Compound (21) | | Compound (88) | | Compound (102) | 3:0:1:0:1 |
| M14 | Compound (28) | Compound (75) | | | Compound (102) | 2:1:0:0:1 |
| M15 | Compound (11) | Compound (75) | Compound (84) | Compound (94) | | 3:1:1:1:0 |
| M16 | Compound (29) | Compound (73) | Compound (89) | | | 3:1:1:0:0 |
| M17 | Comparative compound (1) | Compound (73) | Compound (89) | | | 3:1:1:0:0 |
| M18 | Comparative compound (2) | Compound (73) | Compound (89) | | | 3:1:1:0:0 |
| M19 | Comparative compound (2) | | Compound (88) | | Compound (102) | 3:0:1:0:1 |
| M20 | Comparative compound (1) | | | | | 1:0:0:0:0 |

TABLE 1-continued

|   | Magenta dye General Formula 1 | Magenta dye General Formula 9 | Magenta dye General Formula 10 | Magenta dye General Formula 11 | Magenta dye General Formula 12 | Mixing ratio |
|---|---|---|---|---|---|---|
| M21 | Compound (13) | Compound (73) | | | | 4:1:0:0:0 |
| M22 | Compound (13) | | | | Compound (102) | 4:0:0:0:1 |

Yellow Ink Preparation Examples 1 to 10

Yellow inks (Y1) to (Y10) for thermal transfer recording sheets were each prepared as in Magenta Ink Preparation Example 1, except that the specific yellow dyes shown in Table 2 were used instead at the specific mixing ratio shown in Table 2. The total amount of the colorants was controlled to be 5 parts.

TABLE 2

|   | Yellow dye General Formula 2 | Yellow dye General Formula 3 | Yellow dye General Formula 4 | Yellow dye General Formula 5 | Other dye | Mixing ratio |
|---|---|---|---|---|---|---|
| Y1 | Compound (32) | Compound (38) | | | | 1:1:0:0:0 |
| Y2 | Compound (32) | | | Compound (52) | | 1:0:0:2:0 |
| Y3 | Compound (32) | | | Compound (53) | | 2:0:0:1::0 |
| Y4 | | Compound (39) | Compound (46) | | | 0:2:1:0:0 |
| Y5 | | | Compound (46) | Compound (53) | | 0:0:1:1:0 |
| Y6 | Compound (32) | Compound (39) | | | | 1:2:0:0:0 |
| Y7 | | Compound (39) | Compound (46) | | | 0:1:1:0::0 |
| Y8 | | | Compound (46) | Compound (52) | | 0:2:1:0:0 |
| Y9 | | | | Compound (52) | Compound (109) | 0:0:0:1:1 |
| Y10 | | Compound (38) | | | Compound (110) | 0:1:0:0:1 |

Cyan Ink Preparation Examples 1 to 4

Cyan inks (C1) to (C4) for thermal transfer recording sheets were each prepared as in Magenta Ink Preparation Example 1, except that the specific cyan dyes shown in Table 3 were used instead at the specific mixing ratio shown in Table 3. The total amount of the colorants was controlled to be 5 parts.

TABLE 3

|   | Cyan dye General Formula 6 | Cyan dye General Formula 7 | Cyan dye General Formula 8 | Mixing ratio |
|---|---|---|---|---|
| C1 | Compound (55) | Compound (63) | Compound (67) | 1:1:1 |
| C2 | Compound (55) | Compound (63) | Compound (67) | 1:2:1 |
| C3 | Compound (55) | | Compound (67) | 1:0:1 |
| C4 | Compound (55) | Compound (63) | | 1:1:0 |

Example 1

A polyethylene terephthalate film (Lumirror, produced by Toray Industries, Inc.) having a thickness of 4.5 μm was used as a base material. The base material was coated with the yellow ink (Y1) for thermal transfer recording sheets so that the thickness of the coating film was 1 μm after being dried. The coating film was dried to form a yellow dye layer. A thermal transfer recording sheet (1) having was prepared.

Subsequently, a magenta dye layer was formed in a region adjacent to the yellow dye layer as in the formation of the yellow dye layer, except that the magenta ink (M1) was used instead of the yellow ink (Y1). In the same manner, a cyan dye layer was formed using the cyan ink (C1) in a region adjacent to the magenta dye layer. Thus, a thermal transfer recording sheet according to the present invention, which included the yellow dye layer, the magenta dye layer, and the cyan dye layer, was prepared.

Using the resulting thermal transfer recording sheet including the yellow dye layer, the magenta dye layer, and the cyan dye layer, an image was transferred to a printing paper with Selphy CP900 produced by CANON KABUSHIKI KAISHA. Thus, an image sample (1) was formed. Yellow, magenta, and cyan images were each printed while the printing output was changed from 0% to 100% in intervals of 10% and merged into a single image, which was output as an image sample.

Examples 2 to 18 and Comparative Examples 1 to 4

Thermal transfer recording sheets including the yellow dye layer, magenta dye layer, and cyan dye layer were prepared as in Example 1, except that the yellow ink, magenta ink, and cyan ink used were changed as shown in Table 4. Image samples were output as in Example 1 and evaluated.

Evaluations

Color Gamut Evaluation

Chromaticity (L*, a*, b*) of each image sample formed by thermal transfer based on the L*a*b* color coordinate system was measured using a spectrodensitometer "SpectroLino" (produced by GretagMacbeth GmbH).

The color-reproduction volume was determined using the measurement results to evaluate by how many percent the color-reproduction volume was increased relative to that measured in a comparative example. The comparative example used as a reference was Comparative Example 4, in which only high-chroma magenta dye was used, which presumably enabled the widest color gamut to be achieved among the comparative examples.

The evaluation was made in accordance with the following criteria. Table 4 summarizes the results. It was considered that a sufficiently wide color gamut was achieved when the color-reproduction volume was 100% or more.

A: 105%≤Color-reproduction volume
B: 100%≤Color-reproduction volume<105%
C: 95%≤Color-reproduction volume<100%

TABLE 4

|  | Magenta | Yellow | Cyan | Color gamut volume (%) | Evaluation |
|---|---|---|---|---|---|
| Example 1 | M1 | Y1 | C1 | 105 | A |
| Example 2 | M2 | Y2 | C2 | 101 | B |
| Example 3 | M3 | Y3 | C3 | 107 | A |
| Example 4 | M4 | Y4 | C4 | 101 | B |
| Example 5 | M5 | Y5 | C4 | 105 | A |
| Example 6 | M6 | Y6 | C2 | 101 | B |
| Example 7 | M7 | Y1 | C4 | 106 | A |
| Example 8 | M8 | Y3 | C1 | 105 | A |
| Example 9 | M9 | Y2 | C2 | 103 | B |
| Example 10 | M10 | Y2 | C3 | 107 | A |
| Example 11 | M11 | Y4 | C4 | 100 | B |
| Example 12 | M12 | Y8 | C4 | 100 | B |
| Example 13 | M13 | Y1 | C1 | 103 | B |
| Example 14 | M14 | Y6 | C4 | 105 | A |
| Example 15 | M15 | Y3 | C3 | 102 | B |
| Example 16 | M16 | Y7 | C4 | 105 | A |
| Example 17 | M21 | Y9 | C4 | 107 | A |
| Example 18 | M22 | Y10 | C4 | 108 | A |
| Comparative example 1 | M17 | Y2 | C1 | 97 | C |
| Comparative example 2 | M18 | Y7 | C4 | 99 | C |
| Comparative example 3 | M19 | Y1 | C1 | 99 | C |
| Comparative example 4 | M20 | Y5 | C4 | — | — |

Lightfastness Evaluation

The image samples formed in Examples 1 to 16 and Comparative Examples 1 to 4 were placed in a xenon testing device (Atlas Ci4000, produced by Suga Test Instruments Co., Ltd.), and exposure was performed for 50 hours under the following conditions: luminous intensity: 0.39 W/m² at 340 nm, temperature: 40° C., and relative humidity: 60%.

An optical density (OD) residual ratio was defined as follows, where $OD_0$ represents an initial optical density and $OD_{50}$ represents an optical density measured after the exposure was performed for 50 hours.

OD residual ratio=$OD_{50}/OD_0$

The magenta-component OD residual ratio of a magenta-monochrome 50%-gradation print portion of each image sample was calculated. The evaluation was made in accordance with the following criteria. Table 5 summarizes the results. It was considered that good lightfastness was achieved when the magenta OD residual ratio was 0.7 or more.

A: 0.8≤Magenta OD residual ratio (excellent lightfastness)
B: 0.7≤Magenta OD residual ratio<0.8 (good lightfastness)
C: Magenta OD residual ratio<0.7 (poor lightfastness)

Catalytic Fading Evaluation

The yellow-component OD residual ratio of a yellow-monochrome 50%-gradation print portion, the yellow-component OD residual ratio of a yellow-50%-gradation-magenta-50%-gradation mixed-color print portion, and the difference therebetween were calculated. The effect of mixing magenta with yellow on fading of the yellow component was evaluated on the basis of the difference in the yellow-component OD residual ratio.

The evaluation was made in accordance with the following criteria. Table 5 summarizes the results. It was considered that the degree of catalytic fading was small when the difference in the yellow-component OD residual ratio between the yellow-monochrome print portion and the yellow-magenta mixed-color print portion was less than 0.3.

A: Difference in OD residual ratio<0.2 (slight degree of catalytic fading)
B: 0.2≤Difference in OD residual ratio<0.3 (small degree of catalytic fading)
C: 0.3≤Difference in OD residual ratio (large degree of catalytic fading)

TABLE 5

| | Weather-fastness evaluation | | Yellow OD residual ratio (%) | | | |
|---|---|---|---|---|---|---|
| | Magenta OD residual ratio (%) | Rank | (a) Yellow-monochrome 50%- print portion | (b) Yellow 50% + magenta 50% print portion | Catalytic fading (a-b) | Rank |
| Example 1 | 0.80 | A | 0.95 | 0.77 | 0.18 | A |
| Example 2 | 0.85 | A | 0.97 | 0.79 | 0.18 | A |
| Example 3 | 0.79 | B | 0.97 | 0.79 | 0.18 | A |
| Example 4 | 0.74 | B | 0.99 | 0.80 | 0.19 | A |
| Example 5 | 0.72 | B | 1.00 | 0.73 | 0.27 | B |
| Example 6 | 0.82 | A | 0.95 | 0.81 | 0.14 | A |
| Example 7 | 0.77 | B | 0.95 | 0.75 | 0.20 | B |
| Example 8 | 0.82 | A | 0.97 | 0.78 | 0.19 | A |
| Example 9 | 0.78 | B | 0.97 | 0.80 | 0.17 | A |
| Example 10 | 0.79 | B | 0.97 | 0.80 | 0.17 | A |
| Example 11 | 0.84 | A | 0.99 | 0.79 | 0.20 | B |
| Example 12 | 0.85 | A | 1.00 | 0.82 | 0.18 | A |
| Example 13 | 0.84 | A | 0.95 | 0.78 | 0.17 | A |
| Example 14 | 0.85 | A | 0.95 | 0.82 | 0.13 | A |
| Example 15 | 0.78 | B | 0.97 | 0.76 | 0.21 | B |
| Example 16 | 0.85 | A | 0.99 | 0.81 | 0.18 | A |
| Example 17 | 0.85 | A | 0.98 | 0.81 | 0.17 | A |
| Example 18 | 0.84 | A | 0.99 | 0.84 | 0.15 | A |
| Comparative example 1 | 0.52 | C | 0.97 | 0.33 | 0.64 | C |
| Comparative example 2 | 0.25 | C | 0.99 | 0.50 | 0.49 | C |

TABLE 5-continued

| | Weather-fastness evaluation | | Yellow OD residual ratio (%) | | | |
|---|---|---|---|---|---|---|
| | Magenta OD residual ratio (%) | Rank | (a) Yellow-monochrome 50%-print portion | (b) Yellow 50% + magenta 50% print portion | Catalytic fading (a-b) | Rank |
| Comparative example 3 | 0.24 | C | 0.95 | 0.45 | 0.50 | C |
| Comparative example 4 | 0.51 | C | 1.00 | 0.32 | 0.68 | C |

As is clear from Tables 4 and 5, the images formed using the thermal transfer recording sheets according to the present invention had a wide color gamut and good lightfastness, and the degree of catalytic fading was small.

According to the present invention, a thermal transfer recording sheet that enables images having a wide color gamut, a high chroma, and good lightfastness, in which the degree of catalytic fading is reduced, to be formed may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

By using the thermal transfer recording sheet according to the present invention, images having a high chroma, a wide color gamut, and good lightfastness, in which the degree of catalytic fading is reduced, may be formed.

The invention claimed is:
1. A thermal transfer recording sheet comprising a base material and a colorant layer on the base material, wherein:
the colorant layer includes
a yellow dye layer comprising a yellow dye,
a magenta dye layer comprising a magenta dye, and
a cyan dye layer comprising a cyan dye,
the magenta dye containing a compound represented by General Formula (1),
the yellow dye containing at least one compound selected from the group consisting of compounds represented by General Formulae (2) to (5), and
the cyan dye containing at least one compound selected from the group consisting of compounds represented by General Formulae (6) to (8),

General Formula (1)

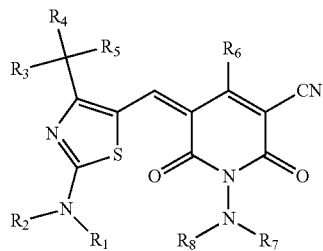

wherein, in General Formula (1),
$R_1$ to $R_6$ each independently represent an alkyl group, and $R_3$ to $R_5$ may be bonded to one another to form a polycyclic or monocyclic saturated cyclic hydrocarbon ring; and $R_7$ and $R_8$ each independently represent an alkyl group or an acyl group or are bonded to each other to form a ring, General Formula (2)

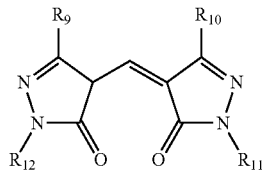

wherein, in General Formula (2), $R_9$ to $R_{12}$ each independently represent an alkyl group, an aryl group having no substituents, or an aryl group having a substituent, General Formula (3)

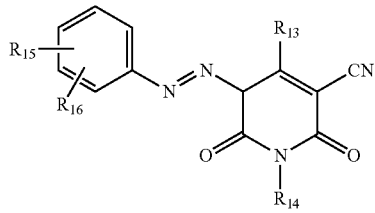

wherein, in General Formula (3),
$R_{13}$ and $R_{14}$ each independently represent an alkyl group, an aryl group having no substituents, or an aryl group having a substituent; and
$R_{15}$ and $R_{16}$ each independently represent a hydrogen atom, an alkyl group, an aryl group having no substituents, an aryl group having a substituent, an alkoxy group, a cyano group, or a halogen atom, General Formula (4)

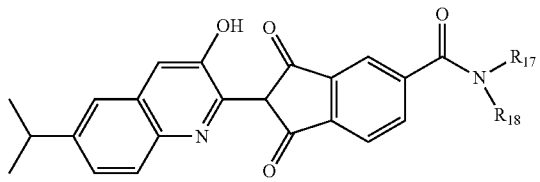

wherein, in General Formula (4), $R_{17}$ and $R_{18}$ each independently represent an alkyl group, an aryl group having no substituents, or an aryl group having a substituent, General Formula (5)

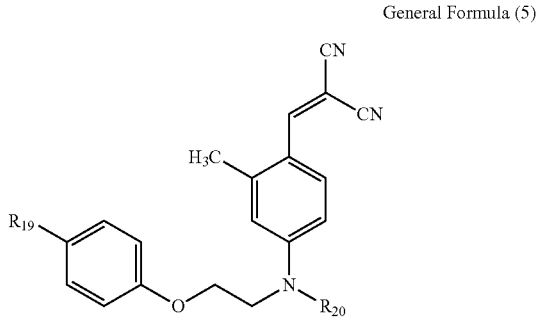

wherein, in General Formula (5), $R_{19}$ and $R_{20}$ each independently represent an alkyl group, an aryl group having no substituents, or an aryl group having a substituent, General Formula (6)

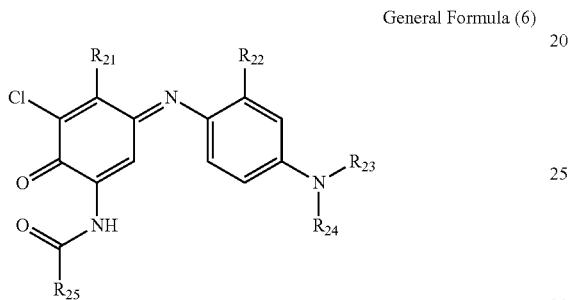

wherein, in General Formula (6), $R_{21}$ to $R_{25}$ each independently represent an alkyl group, an aryl group having no substituents, or an aryl group having a substituent, General Formula (7)

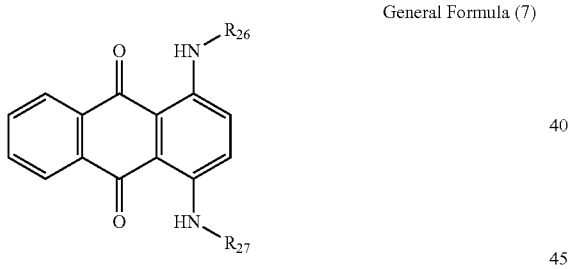

wherein, in General Formula (7), $R_{26}$ and $R_{27}$ each independently represent an alkyl group, an aryl group having no substituents, or an aryl group having a substituent, and General Formula (8)

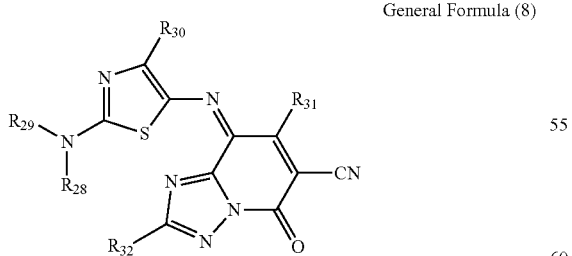

wherein, in General Formula (8), $R_{28}$ to $R_{32}$ each independently represent an alkyl group, an aryl group having no substituents, or an aryl group having a substituent.

2. The thermal transfer recording sheet according to claim 1, wherein any one of $R_7$ and $R_8$ in General Formula (1) is an alkyl group.

3. The thermal transfer recording sheet according to claim 1, wherein $R_3$ to $R_5$ in General Formula (1) are all methyl groups.

4. The thermal transfer recording sheet according to claim 1, wherein the magenta dye further includes at least one compound selected from the group consisting of compounds represented by General Formulae (9) to (12), General Formula (9)

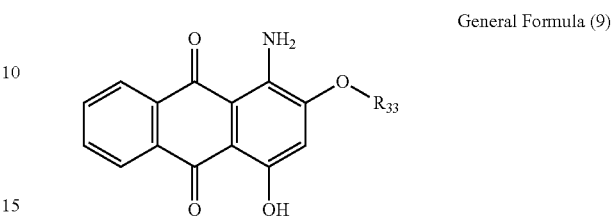

wherein, in General Formula (9), $R_{33}$ represents an alkyl group, an aryl group having no substituents, an aryl group having a substituent, or —$(R_{45}$—O)n-$R_{46}$, $R_{45}$ represents alkylene, and $R_{46}$ represents an alkyl group, General Formula (10)

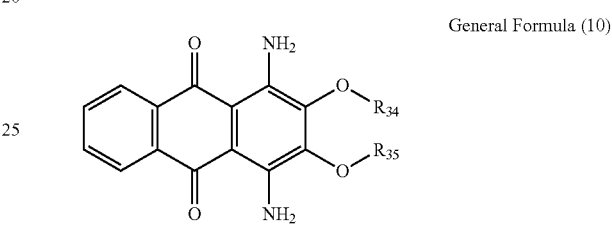

wherein, in General Formula (10), $R_{34}$ and $R_{35}$ each independently represent an alkyl group, an aryl group having no substituents, or an aryl group having a substituent, General Formula (11)

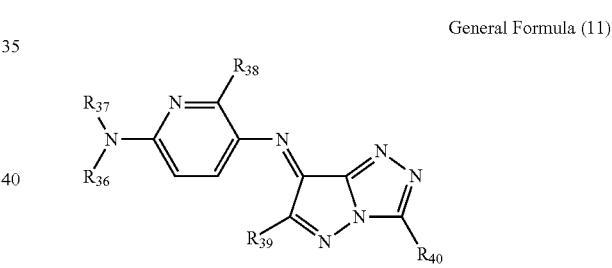

wherein, in General Formula (11), $R_{36}$ to $R_{40}$ each independently represent an alkyl group, an aryl group having no substituents, or an aryl group having a substituent, and General Formula (12)

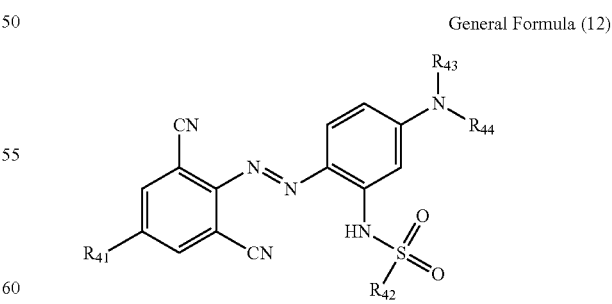

wherein, in General Formula (12), $R_{41}$ to $R_{44}$ each independently represent an alkyl group, an aryl group having no substituents, or an aryl group having a substituent.

* * * * *